(12) United States Patent
Rusanovskyy et al.

(10) Patent No.: US 11,601,666 B2
(45) Date of Patent: Mar. 7, 2023

(54) DERIVATION OF TEMPORAL MOTION VECTOR PREDICTION CANDIDATES IN VIDEO CODING

(71) Applicant: QUALCOMM Incorporated, San Diego, CA (US)

(72) Inventors: Dmytro Rusanovskyy, San Diego, CA (US); Marta Karczewicz, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/909,856

(22) Filed: Jun. 23, 2020

(65) Prior Publication Data
US 2020/0413081 A1 Dec. 31, 2020

Related U.S. Application Data

(60) Provisional application No. 62/868,462, filed on Jun. 28, 2019, provisional application No. 62/867,021, (Continued)

(51) Int. Cl.
*H04N 19/51* (2014.01)
*H04N 19/176* (2014.01)
*H04N 19/70* (2014.01)

(52) U.S. Cl.
CPC ........... *H04N 19/51* (2014.11); *H04N 19/176* (2014.11); *H04N 19/70* (2014.11)

(58) Field of Classification Search
CPC .... H04N 19/176; H04N 19/52; H04N 19/159; H04N 19/513; H04N 19/109
See application file for complete search history.

(56) References Cited

U.S. PATENT DOCUMENTS

2012/0287995 A1* 11/2012 Budagavi ............. H04N 19/593
375/240.12
2013/0128977 A1* 5/2013 Yu ........................ H04N 19/503
375/240.16
(Continued)

FOREIGN PATENT DOCUMENTS

EP 3139611 A1 3/2017
WO 2013078248 A1 5/2013
(Continued)

OTHER PUBLICATIONS

Joint Video Exploration Team, "JVET Marrakech Meeting, Jan. 9-Jan. 18, 2019, Versatile Video Coding (Draft 4)" Date Accessed Sep. 6, 2021, URL: http://phenix.int-evry.fr/jvet/doc_end_user/current_document.php?id=5755 (Year: 2019).*
(Continued)

*Primary Examiner* — Daniel Chang
(74) *Attorney, Agent, or Firm* — Shumaker & Sieffert, P.A.

(57) ABSTRACT

An example method includes coding, by a video coder and via a coded video bitstream, a syntax element that specifies whether the coded video bitstream includes a plurality of syntax elements that specify parameters of a temporal motion vector prediction (TMVP) candidate derivation process; where the syntax element specifies that the coded video bitstream includes the plurality of syntax elements: coding, by the video coder, the plurality of syntax elements via the coded video bitstream; and deriving, by the video coder and based on parameters specified by the plurality of syntax elements, a TMVP candidate for a current block of a current picture of video data; generating, for the current block, a list of motion vector candidates, the list including the derived TMVP candidate; and predicting, based on the list of motion vector candidates, the current block.

16 Claims, 13 Drawing Sheets

Related U.S. Application Data filed on Jun. 26, 2019, provisional application No. 62/866,536, filed on Jun. 25, 2019.

(56) References Cited

U.S. PATENT DOCUMENTS

| | | | | |
|---|---|---|---|---|
| 2013/0272406 | A1* | 10/2013 | Yu | H04N 19/463 375/240.16 |
| 2013/0336399 | A1* | 12/2013 | Yu | H04N 19/521 375/240.14 |
| 2013/0336403 | A1* | 12/2013 | Naing | H04N 19/105 375/240.16 |
| 2014/0023142 | A1* | 1/2014 | Yu | H04N 19/513 375/240.16 |
| 2014/0086325 | A1* | 3/2014 | Chen | H04N 19/31 375/240.14 |
| 2014/0092970 | A1* | 4/2014 | Misra | H04N 19/52 375/240.16 |
| 2014/0092971 | A1* | 4/2014 | Misra | H04N 19/61 375/E7.243 |
| 2014/0092972 | A1* | 4/2014 | Misra | H04N 19/136 375/E7.123 |
| 2014/0369415 | A1* | 12/2014 | Naing | H04N 19/70 375/240.16 |
| 2015/0281733 | A1* | 10/2015 | Fu | H04N 19/105 375/240.16 |
| 2016/0100189 | A1* | 4/2016 | Pang | H04N 19/593 375/240.13 |
| 2017/0289566 | A1* | 10/2017 | He | H04N 19/52 |
| 2017/0302951 | A1* | 10/2017 | Joshi | H04N 19/513 |
| 2020/0036998 | A1* | 1/2020 | Xu | H04N 19/52 |

FOREIGN PATENT DOCUMENTS

| | | |
|---|---|---|
| WO | 2013159643 A1 | 10/2013 |
| WO | 2016165069 A1 | 10/2016 |

OTHER PUBLICATIONS

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG11 and ITU-T SG 16 WP 3), JCTVC-L1003_v34, Mar. 19, 2013, 310 pages.

Zhou T., et al., "CE4.4.1: Spatial-Temporal Merge Mode", JVET-L0354, Joint Video Exploration Team (JVET) of ITU-T SG 16 WP3 and ISO/IEC JTC1/SC 29/WG 11, 12th Meeting, Macau, CH, Oct. 2018, pp. 1-4.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages, Retrieved from the Internet: URL: http://phenix.int-evry.fr/jvet/doc_end_user/documents/13_Marrakech/wg11/JVET-M1001-v7.zipJVET-M1001-v7.docx, [retrieved on Mar. 17, 2019] the whole document.

Bross B., et al., "Versatile Video Coding (Draft 5)", 14th JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v9, Jun. 25, 2019 (Jun. 25, 2019), XP030220730, 403 Pages, Retrieved from the Internet: URL:http://phenix.int-evry.fr/jvet/doc_end_user/documents/14_Geneva/wg11/JVET-N1001-v9.zip, JVET-N1001-v9.docx [retrieved on Jun. 25, 2019].

Chao Y-H., et al., "CE4.2.3: STMVP Simplification", JVET-M0221, Joint Video Experts Team (JVET) of ITU-T SG 16 WP 3 and ISO/IEC JTC 1/SC 29/WG 11, 13th Meeting, Marrakech, MA, Jan. 9-18, 2019, 3 Pages.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 51 Pages, pp. i-iv, Retrieved from the Internet: URL: http://phenix.int-evry.fr/jvet/doc_end_user/documents/7_Torino/wg11/JVET-G0001-v1.zip.

HE (Interdigital) Y., et al., "MV-HEVC/SHVC HLS: On SHVC High Level Syntax", 5. JCT-3V Meeting, Jul. 27, 2013-Aug. 2, 2013, Vienna, (The Joint Collaborative Team on 3D Video Coding Extension Development of ISO/IEC JTC1/SC29/WG11 and ITU-T SG.16), No. JCT3V-E0097, Jul. 25, 2013 (Jul. 25, 2013), XP030244455, pp. 1-9, Retrieved from the Internet: URL: http://phenix.int-evry.fr/jct2/doc_end_user/documents/5_Vienna/wg11/JCT3V-E0097-v2.zip JCTVC-N0217-JCT3V-E0097_r1.docx [retrieved on Jan. 13, 2014] Section 4.1.2.1.

International Search Report and Written Opinion—PCT/US2020/039311—ISA/EPO—dated Oct. 2, 2020.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Rusanovskyy (Qualcomm) D., et al.,: "[EVC] Suggested Improvements for WD and TM", 127. MPEG Meeting, Jul. 8, 2019-Jul. 12, 2019, Gothenburg, (Motion Picture Expert Group or ISO/IEC JTC1/SC29/WG11), No. m49023, Jul. 3, 2019 (Jul. 3, 2019), XP030207151, Retrieved from the Internet: URL: http://phenix.int-evry.fr/mpeg/doc_end_user/documents/127_Gothenburg/wg11/m49023-V1-m49023_ETM_Improvements.zip m4903_SpecText_Improvement.docx [retrieved on Jul. 3, 2019].

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Yu Y., et al., "AHG21: The Improvements on Reference Picture Buffering and List Construction", Joint Video Team (JVT) of ISO/IEC MPEG & ITU-T VCEG (ISO/IEC JTC1/SC29/WG11 and ITU-T SG16 Q6), XX, XX, No. JCTVC-G717-r1, Nov. 24, 2011 (Nov. 24, 2011), pp. 1-9, XP002696914, Retrieved from the Internet: URL:7. JCT-VC Meeting Section 2.2.

Zhang (Bytedance) L., et al., "CE4-related: History-based Motion Vector Prediction", 11. JVET Meeting, Jul. 11, 2018-Jul. 18, 2018, Ljubljana, (The Joint Video Exploration team of ISO/IEC JTC1/SC29/WG11 and ITU-TSG. 16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018].

* cited by examiner

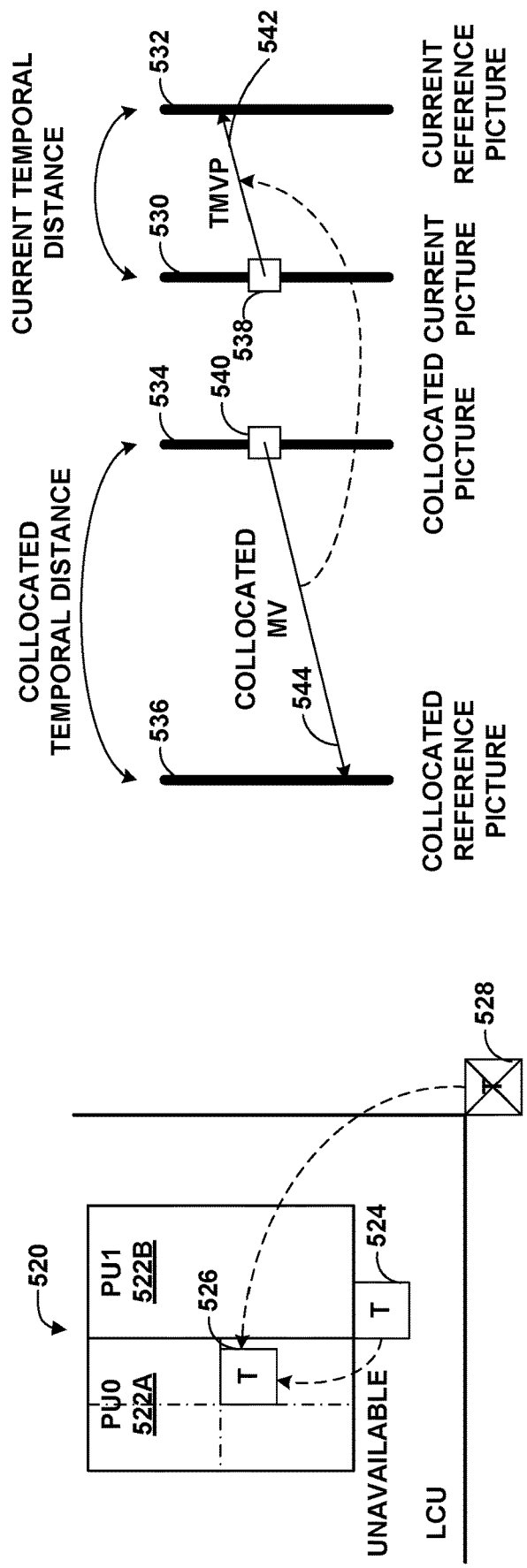

DERIVATION OF TEMPORAL MOTION VECTOR PREDICTION CANDIDATES IN VIDEO CODING

This application claims the benefit of U.S. Provisional Application No. 62/866,536, filed Jun. 25, 2019, U.S. Provisional Application No. 62/867,021, filed Jun. 26, 2019, and U.S. Provisional Application No. 62/868,462, filed Jun. 28, 2019, each of which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for deriving temporal motion vector prediction (TMVP) candidates for video coding. To determine a motion vector for a current block of video data, a video coder may generate a list of motion vector candidates. Examples of candidates that may be included in the list are spatial candidates, TMVP candidates, history based MVP candidates, pairwise candidates, combined bidirectional, and/or default candidates. Both a video encoder and a video decoder may generate identical lists, and the video encoder may signal an index to the video coder that indicates which candidate from the list is to be used.

A video coder may derive a TMVP candidate in the same manner for every block of video data. For instance, the video coder may derive the TMVP candidate using inferred default parameters such that the video coder derives the TMVP candidate from a co-located prediction unit (PU) in a co-located picture. However, in some examples, the TMVP candidate derived based on the default parameters may not be the best TMVP candidate. For instance, other motion vectors from other pictures may identify reference blocks with samples that more closely match samples of a current block. Having a reference block with samples that more closely match samples of a current block may improve coding efficiency by reducing the size of residual data.

In accordance with one or more techniques of this disclosure, the derivation of TMVP candidates may be made more flexible. For instance, as opposed to inferring parameters that control TMVP candidate derivation (the TMVP parameters), a video coder may explicitly signal parameters that control TMVP candidate derivation. Some example parameters that may be signaled include a reference picture list for derivation of a collocated picture for derivation of the TMVP candidate, a reference index of the collocated picture, and a reference picture list for derivation of a motion vector candidate for derivation of the TMVP candidate. By explicitly signaling the parameters, the video encoder may be able to select a TMVP candidate that identifies a reference block with samples that more closely match samples of a current block. The resulting reduction in residual data size may be more that the data used to signal the TMVP parameters. In this way, the techniques of this disclosure may improve coding efficiency (e.g., by reducing the amount of data used to encode video data).

In some examples, the video coder may selectively signal the TMVP parameters. For instance, as opposed to always inferring the TMVP parameters or always explicitly signaling the TMVP parameters, the video coder may signal a syntax element that indicates whether or not the TMVP parameters are explicitly signalled. Where the syntax element indicates that the TMVP parameters are explicitly signalled, the video coder may code a plurality of syntax elements that specify the TMVP parameters. Otherwise (e.g., where the syntax element does not indicate that the TMVP parameters are explicitly signalled), the video coder may infer the TMVP parameters. In some examples, a video encoder may select to infer the TMVP parameters where the amount of data to explicitly signal TMVP parameters would be greater than the amount of data saved by using a TMVP candidate other than the TMVP candidate derived based on the inferred TMVP parameters. In this way, the techniques of this disclosure may improve coding efficiency (e.g., by reducing the amount of data used to encode video data).

In one example, a method includes coding, by a video coder and via a coded video bitstream, a syntax element that specifies whether the coded video bitstream includes a plurality of syntax elements that specify parameters of a TMVP candidate derivation process; where the syntax element specifies that the coded video bitstream includes the plurality of syntax elements: coding, by the video coder, the plurality of syntax elements via the coded video bitstream; and deriving, by the video coder and based on parameters specified by the plurality of syntax elements, a TMVP candidate for a current block of a current picture of video data; generating, for the current block, a list of motion vector candidates, the list including the derived TMVP candidate; and predicting, based on the list of motion vector candidates, the current block.

In another example, a device includes a memory configured to store at least a portion of a coded video bitstream; and one or more processors that are implemented in circuitry and configured to: code, via the coded video bitstream, a syntax element that specifies whether the coded video bitstream includes a plurality of syntax elements that specify parameters of a temporal motion vector prediction (TMVP) candidate derivation process; where the syntax element specifies that the coded video bitstream includes the plurality of syntax elements: code the plurality of syntax elements via the coded video bitstream; and derive, based on parameters specified by the plurality of syntax elements, a TMVP candidate for a current block of a current picture of video data; generate, for the current block, a list of motion vector candidates, the list including the derived TMVP candidate; and predict, based on the list of motion vector candidates, the current block.

In another example, a device includes means for coding, via a coded video bitstream, a syntax element that specifies whether the coded video bitstream includes a plurality of syntax elements that specify parameters of a TMVP candidate derivation process; means for coding the plurality of syntax elements via the coded video bitstream where the syntax element specifies that the coded video bitstream includes the plurality of syntax elements; means for deriving, based on parameters specified by the plurality of syntax elements, a TMVP candidate for a current block of a current picture of video data; means for generating, for the current block, a list of motion vector candidates, the list including the derived TMVP candidate; and means for predicting, based on the list of motion vector candidates, the current block In another example, a computer-readable storage medium stores instructions that, when executed by one or more processors of a video coder, cause the one or more processors to: code, via a coded video bitstream, a syntax element that specifies whether the coded video bitstream includes a plurality of syntax elements that specify parameters of a TMVP candidate derivation process; where the syntax element specifies that the coded video bitstream includes the plurality of syntax elements: code, by the video coder, the plurality of syntax elements via the coded video bitstream; and derive, by the video coder and based on parameters specified by the plurality of syntax elements, a TMVP candidate for a current block of a current picture of video data; generate, for the current block, a list of motion vector candidates, the list including the derived TMVP candidate; and predict, based on the list of motion vector candidates, the current block.

The details of one or more examples are set forth in the accompanying drawings and the description below. Other features, objects, and advantages will be apparent from the description, drawings, and claims.

BRIEF DESCRIPTION OF DRAWINGS

FIGS. 3A and 3B are conceptual diagrams illustrating temporal motion vector prediction in HEVC.

DETAILED DESCRIPTION

Figure 1:
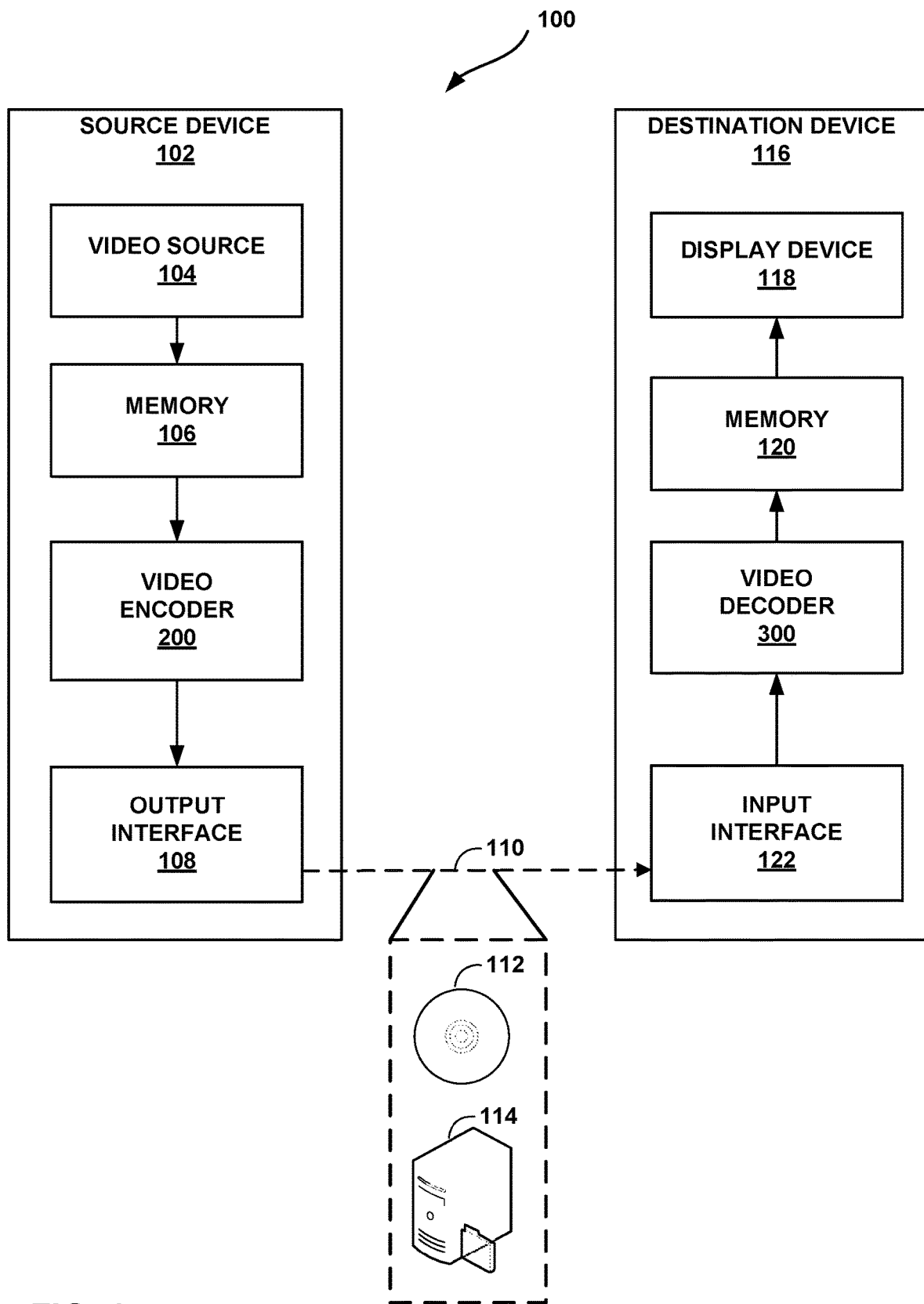
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for derivation of temporal motion vector prediction (TMVP). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for TMVP. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v9 (hereinafter "VVC Draft 5") is available at phenix.it-sudparis.eu/jvet/doc_end_user/documents/14_Geneva/wg11/JVET-N1001-v9.zip. A former draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13th Meeting: Marrakech, Mass., 9-18 Jan. 2019, JVET-M1001-v7 (hereinafter "VVC Draft 4") is available at phenix.it-sudparis.eu/jvet/doc_end_user/documents/14_Geneva/wg11/JVET-M1001-v7.zip. In other examples, video encoder 200 and video decoder 300 may operate according to one or more versions of the developing MPEG-5/EVC (Essential Video Coding) standard. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to EVC, JEM, or VVC. According to EVC, JEM, or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT)

partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of EVC, JEM, and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of EVC, JEM, and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As discussed above, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). A draft of the HEVC standard may be obtained from itu.int/rec/T-REC-H.265-201802-I/en, (hereinafter the "HEVC Standard").

ITU-T VCEG (Q6/16) and ISO/IEC MPEG (JTC 1/SC 29/WG 11) studied the potential need for standardization of future video coding technology with a compression capability that significantly exceeds that of the HEVC Standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM 7) could be obtained from jvet.hhi.fraunhofer.de/svn/svn_-HMJEMSoftware/tags/HM-16.6-JEM-73.0/.

The Joint Video Experts Team (JVET) of ITU-T WP3/16 and ISO/IEC JTC 1/SC 29/WG 11 held its eleventh meeting during 10-18 Jul. 2018 at the GR-Ljubljana Exhibition and Convention Centre (Dunajska cesta 18, 1000 Ljubljana, Slovenia). The name Versatile Video Coding (VVC) was chosen as the informal nickname for the new standard. The reference software VTM and BMS could be download from jvet.hhi.fraunhofer.de/svn/svn_VVCSoftware_VTM/ and jvet.hhi.fraunhofer.de/svn/svn_VVCSoftware_BMS/. As discussed above, the current draft of the VVC standard is referred to herein as VVC Draft 5.

The following reviews CU structure and motion vector prediction in HEVC. In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, such as inter-coded or intra-coded. Inter-coded may also be referred to as inter-prediction coded or inter-predicted. Intra-coded may also be referred to as intra-prediction coded or intra-predicted.

When a CU is inter-coded, the CU may be further partitioned into 2 or 4 prediction units (PUs) or may be one PU when further partition is not applied. When two PUs are present in one CU, the PUs can be half size rectangles or two rectangle size with ¼ or ¾ size of the CU. When the CU is inter-coded, each PU has one set of motion information, which is derived with an inter-prediction mode.

The following reviews motion vector prediction. In the HEVC standard, there are two inter-prediction modes, named merge (skip is considered as a special case of merge) and advanced motion vector prediction (AMVP) modes, respectively, for a prediction unit (PU). In either AMVP or merge mode, a motion vector (MV) predictor list (also called MV candidate list) is maintained for multiple motion vector predictors. The motion vector predictor list may be referred to as motion vector predictor list. The motion vector(s), as well as reference indices in the merge mode, of the current PU are generated by taking one candidate from the motion vector predictor list. The motion vector predictor list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current block, as well as the associated motion vectors are determined. In other words, the motion vector and the reference picture identified in the motion vector predictor list by the merge index are set equal to the motion vector and reference picture of the current block.

On the other hand, under AMVP mode, for each potential prediction direction from either list 0 or list 1, a reference index needs to be explicitly signaled, together with an MV predictor (MVP) index to the motion vector predictor list since the AMVP candidate contains only a motion vector. In AMVP mode, the predicted motion vectors can be further refined (e.g., based on a motion vector difference (MVD) described above). The candidates for both modes are derived similarly from the same spatial and temporal neighboring blocks.

Figure 2B:
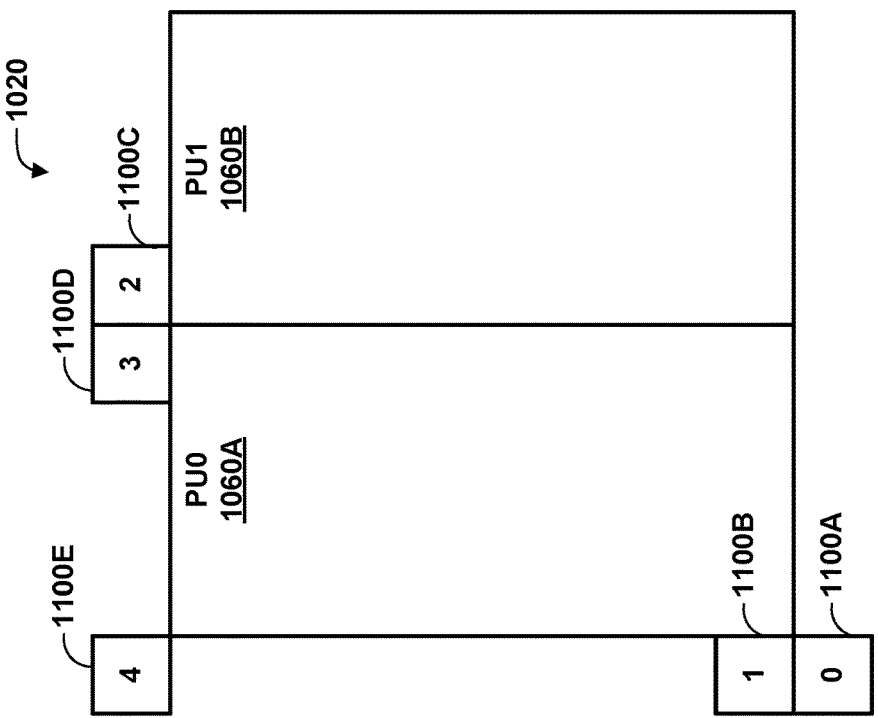
FIGS. 2A and 2B are conceptual diagrams illustrating spatial neighboring candidates in HEVC.
Figure 2A:
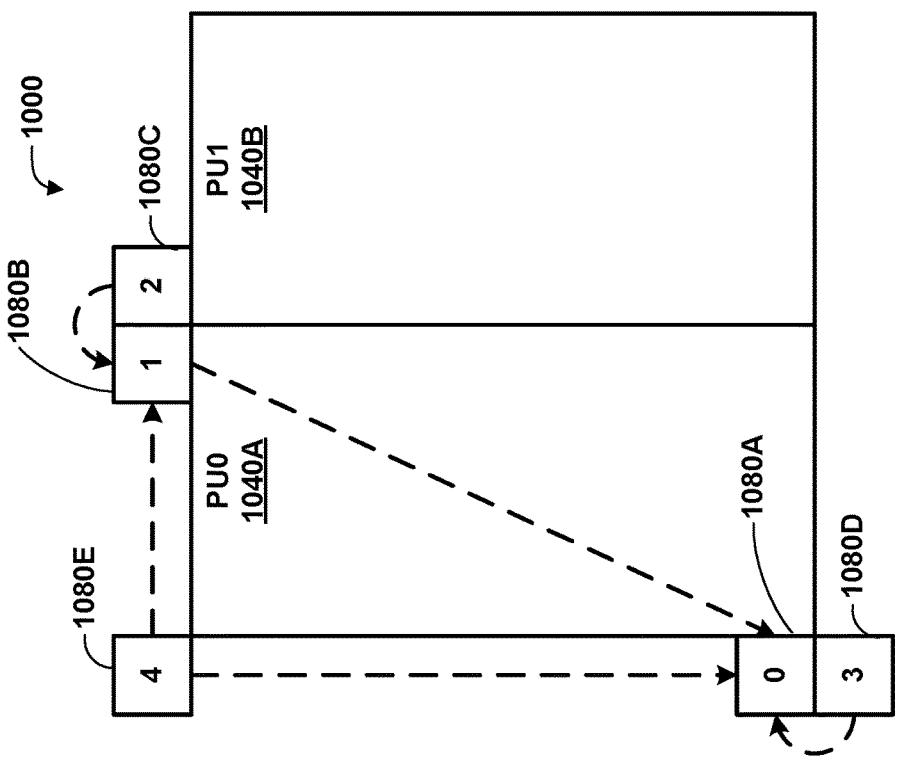

FIGS. 2A and 2B are conceptual diagrams illustrating spatial neighboring candidates in HEVC. Spatial MV candidates are derived from the neighboring blocks shown in FIGS. 2A and 2B, for a specific PU (PU0), although the methods of generating the candidates from the blocks differ for merge and AMVP modes.

In merge mode, up to four spatial MV candidates can be derived with the orders shown in FIG. 2A with numbers, and the order is the following: left (0, A1), above (1, B1), above-right (2, B0), below-left (3, A0), and above left (4, B2), as shown in FIG. 2A. That is, in FIG. 2A, block 1000 includes PU0 1040A and PU1 1040B. When a video coder is to code motion information for PU0 1040A using merge mode, the video coder adds motion information from spatial neighboring blocks 1080A, 1080B, 1080C, 1080D, and 1080E to a candidate list, in that order. Blocks 1080A, 1080B, 1080C, 1080D, and 1080E may also be referred to as, respectively, blocks A1, B1, B0, A0, and B2, as in HEVC.

In AVMP mode, in some examples, the neighboring blocks are divided into two groups: a left group including blocks 0 and 1, and an above group including blocks 2, 3, and 4 as shown on FIG. 2B. These blocks are labeled, respectively, as blocks 1100A, 1100B, 1100C, 1100D, and 1100E in FIG. 2B. In particular, in FIG. 2B, block 1020 includes PU0 1060A and PU1 1060B, and blocks 1100A, 1100B, 1100C, 1100D, and 1100E represent spatial neighbors to PU0 1060A. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

FIGS. 3A and 3B are conceptual diagrams illustrating temporal motion vector prediction (TMVP) in HEVC. In particular, FIG. 3A illustrates an example CU 520 including PU0 522A and PU 1 522B. PU0 522A includes a center block 526 for PU 522A and a bottom-right block 524 to PU0 522A. FIG. 3A also shows an external block 528 for which motion information may be predicted from motion information of PU0 522A, as discussed below. FIG. 3B illustrates a current picture 530 including a current block 538 for which motion information is to be predicted. In particular, FIG. 3B illustrates a collocated picture 534 to current picture 530 (including collocated block 540 to current block 538), a current reference picture 532, and a collocated reference picture 536. Collocated block 540 is predicted using motion vector 544, which is used as a temporal motion vector predictor (TMVP) 542 for motion information of block 538.

A video coder may add a TMVP candidate (e.g., TMVP candidate 542) into the MV candidate list after any spatial motion vector candidates if TMVP is enabled and the TMVP candidate is available. The process of motion vector derivation for the TMVP candidate is the same for both merge and AMVP modes. However, the target reference index for the TMVP candidate in the merge mode is set to 0, according to HEVC.

The primary block location for the TMVP candidate derivation is the bottom right block outside of the collocated PU, as shown in FIG. 3A as block 524 to PU0 522A, to compensate the bias to the above and left blocks used to generate spatial neighboring candidates. However, if block 524 is located outside of the current CTB row or motion information is not available for block 524, the block is substituted with center block 526 of the PU as shown in FIG. 3A. The motion vector for TMVP candidate 542 is derived from co-located block 540 of collocated picture 534, as indicated in slice level information.

Similar to temporal direct mode in AVC, a motion vector of the TMVP candidate may be subject to motion vector scaling, which is performed to compensate picture order count (POC) distance differences between current picture 530 and current reference picture 532, and collocated picture 534 and collocated reference picture 536. That is, motion vector 544 may be scaled to produce TMVP candidate 542, based on these POC differences.

Motion Vector Prediction in Merge/Skip Mode will now be described. For the skip mode and merge mode, a merge index is signaled to indicate which candidate in the merging candidate list is used. No inter prediction indicator, reference index, or MVD is transmitted. Two types of merging candidates may be considered in merge mode: spatial motion vector predictor (SMVP) and temporal motion vector predictor (TMVP). For SMVP derivation, a maximum of four merge candidates are selected among candidates that are located in positions as depicted in FIG. 2A. The order of derivation is $A_1 \rightarrow B_1 \rightarrow B_0 \rightarrow A_0 \rightarrow (B_2)$. Position $B_2$ is considered only when any PU of position $A_1$, $B_1$, $B_0$, $A_0$ is not available or is intra coded or the total number of candidates, after pruning, from positions $A_1$, $B_1$, $B_0$, $A_0$ is less than four.

In the derivation of TMVP, a scaled motion vector may be derived based on co-located PU belonging to one of the reference pictures of current picture within the signaled reference picture list. The reference picture list to be used for derivation of the co-located PU may be explicitly signalled in the slice header (e.g., ref_pic_list_idx). The scaled motion vector for temporal merge candidate is obtained with the scaled motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC Specification. For a B-slice, two motion vectors, one is for reference picture list 0 and the other is for reference picture list 1, are obtained and combined to make the bi-predictive merge candidate. This process may be referred to as deriving the TMVP based on implicit parameters.

Figure 4B:
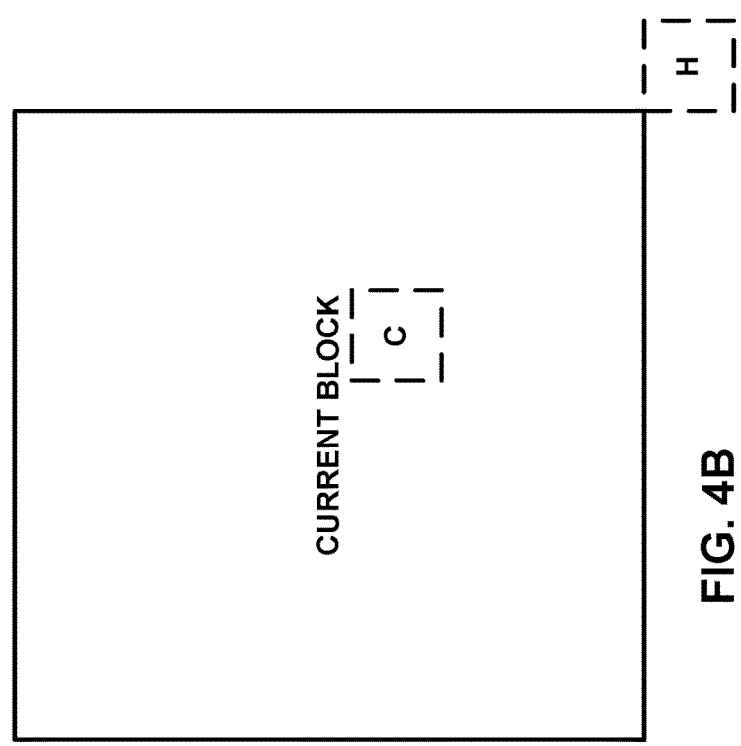
FIGS. 4A and 4B are conceptual diagrams illustrating spatial and temporal neighboring motion vector candidate for merge/skip modes
Figure 4A:
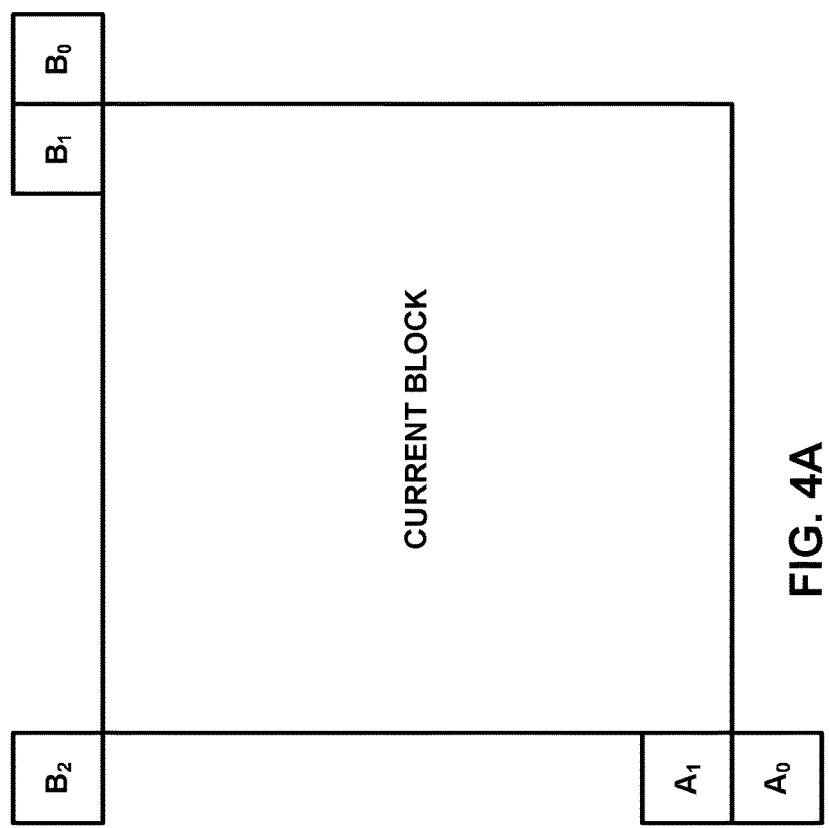

FIGS. 4A and 4B are conceptual diagrams illustrating spatial and temporal neighboring motion vector candidate for merge/skip modes. As shown in FIG. 4B, the position of co-located PU is selected between two candidate positions, C and H. If the PU at position H is not available, or is intra coded, or is outside of the current CTU row, position C is used. Otherwise, position H is used for the derivation of the temporal merge candidate.

Besides SMVPs and TMVPs, there are two additional types of synthetic merge candidates: combined bi-predictive MVP and zero MVP. Combined bi-predictive MVP are generated by utilizing SMVP and TMVP. Combined bi-predictive merge candidate is used for B-Slice only. For example, two candidates in the original merge candidate list, which have mvL0 and refIdxL0 or mvL1 and refIdxL1, are used to create a combined bi-predictive merge candidate.

In the process of candidate selection, duplicated candidates having the same motion parameters as the previous candidate in the processing order are removed from the candidate list. This process is defined as pruning process. Also, candidates inside the same merge estimation region (MER) are not considered, in order to help parallel merge processing. Redundant partition shape is avoided in order to not emulate a virtual 2N×2N partition.

Between each generation step, the derivation process is stopped if the number of candidates reaches to MaxNumMergeCand. In the current common test condition, MaxNumMergeCand is set equal to five. Since the number of candidates is constant, index of best merge candidate is encoded using truncated unary binarization (TU).

Several aspects of motion prediction in HEVC are discussed below.

Motion vector scaling: It is assumed that the value of a motion vector is proportional to the distance between pictures in presentation time. A motion vector associates two pictures: the reference picture and the picture containing the motion vector (namely the containing picture). When a motion vector is used by video encoder 20 or video decoder 30 to predict another motion vector, the distance between the containing picture and the reference picture is calculated based on Picture Order Count (POC) values.

For a motion vector to be predicted, its associated containing picture and reference picture are different. That is, there are two POC difference values for two distinct motion vectors: a first motion vector to be predicted, and a second motion vector used to predict the first motion vector. Moreover, the first POC difference is the difference between the current picture and the reference picture of the first motion vector, and the second POC difference is the difference between the picture containing the second motion vector and the reference picture to which the second motion vector refers. The second motion vector may be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates may be generated and inserted at the end of the list until the list includes a predetermined number of candidates.

In merge mode, there are two types of artificial MV candidates: combined candidates derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

In some examples, video encoder 200 and video decoder 300 may perform a pruning process for candidate insertion. Candidates from different blocks may happen to be the same, which decreases the efficiency of a merge/AMVP candidate list. A pruning process may be applied to solve this problem. According to the pruning process, a video coder compares one candidate to the others in the current candidate list to avoid inserting an identical candidate, to a certain extent. To reduce the complexity, only limited numbers of pruning processes are applied, instead of comparing each potential candidate with all other existing candidates already in the list.

Advanced temporal motion vector prediction (ATMVP) was proposed to allow each PU to obtain multiple sets of motion information (including motion vectors and reference frames). The motion information in ATMVP comes though only from the reference pictures. To derive ATMVP of the current PU, first step is determining where the temporal motion vectors to be fetched. The video coder finds the first available motion vector in five neighboring blocks in the order or Left, Above, Above-right, Left-bottom, and Above-left. The definition of the five neighboring blocks is the same as spatial merge candidates of the current PU. To avoid the repetitive scanning process of neighboring blocks, the video coder may only find the motion vector of the first merge candidate in the already-derived merge candidate list to determine where to fetch the temporal motion vector. The video coder may split the PUs into square N×N sub-PUs (e.g., N is set to 4). The motion vectors of the sub-PUs are derived recursively, following raster scan order.

Figure 5:
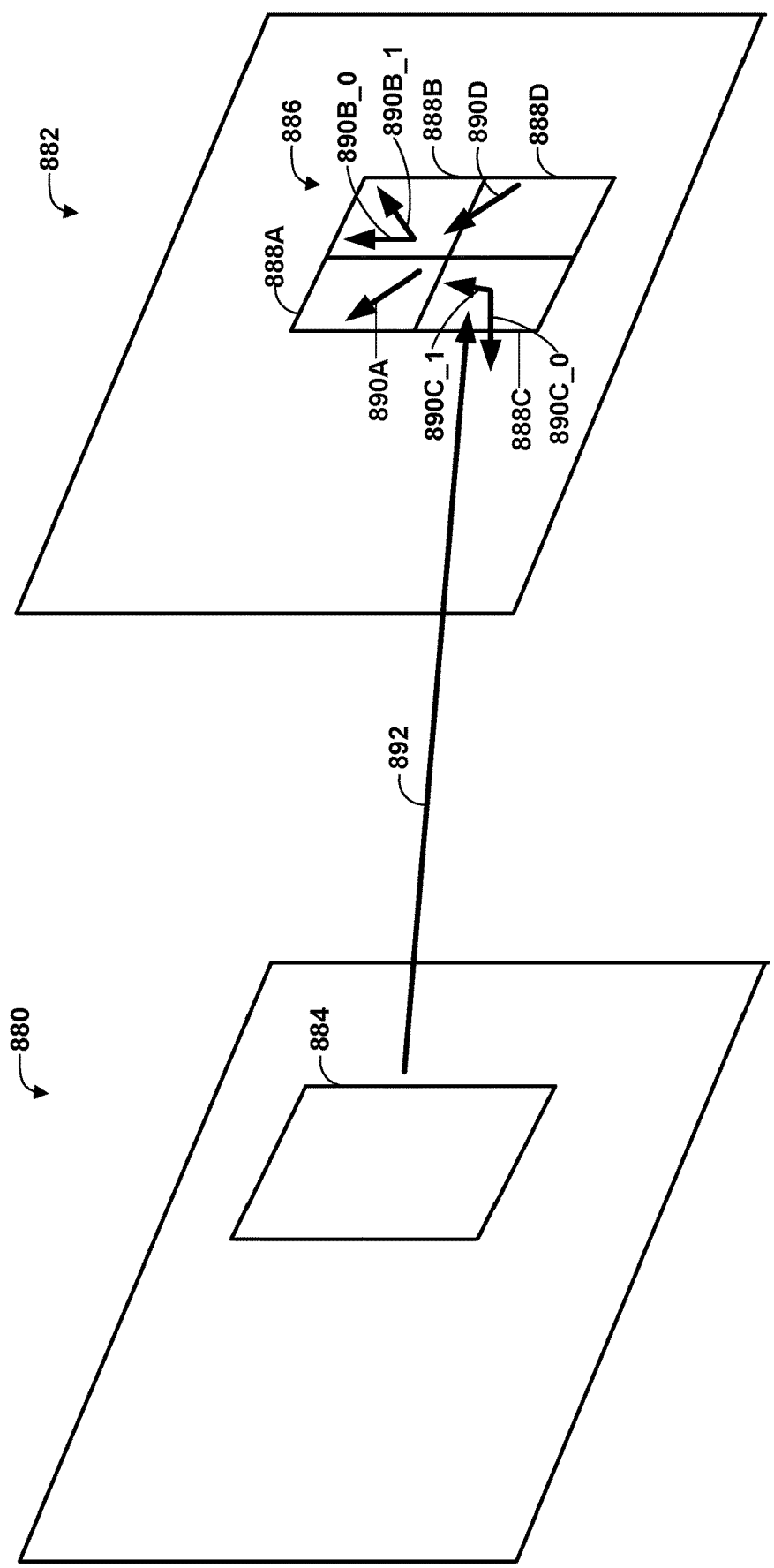
FIG. 5 is a conceptual diagram illustrating sub-PU motion prediction from a reference picture.

FIG. 5 is a conceptual diagram illustrating sub-PU motion prediction from a reference picture. In this example, current picture 880 includes a current PU 884 (e.g., a PU). In this example, motion vector 892 identifies PU 886 of reference picture 882 relative to PU 884. PU 886 is partitioned into sub-PUs 888A-888D, each having respective motion vectors 890A-890D. Thus, although current PU 884 is not actually partitioned into separate sub-PUs, in this example, current PU 884 may be predicted using motion information from sub-PUs 888A-888D. In particular, a video coder may code sub-PUs of current PU 884 using respective motion vectors 890A-890D. However, the video coder need not code syntax elements indicating that current PU 884 is split into sub-PUs. In this manner, current PU 884 may be effectively predicted using multiple motion vectors 890A-890D, inherited from respective sub-PUs 888A-888D, without the signaling overhead of syntax elements used to split current PU 884 into multiple sub-PUs.

Figure 6:
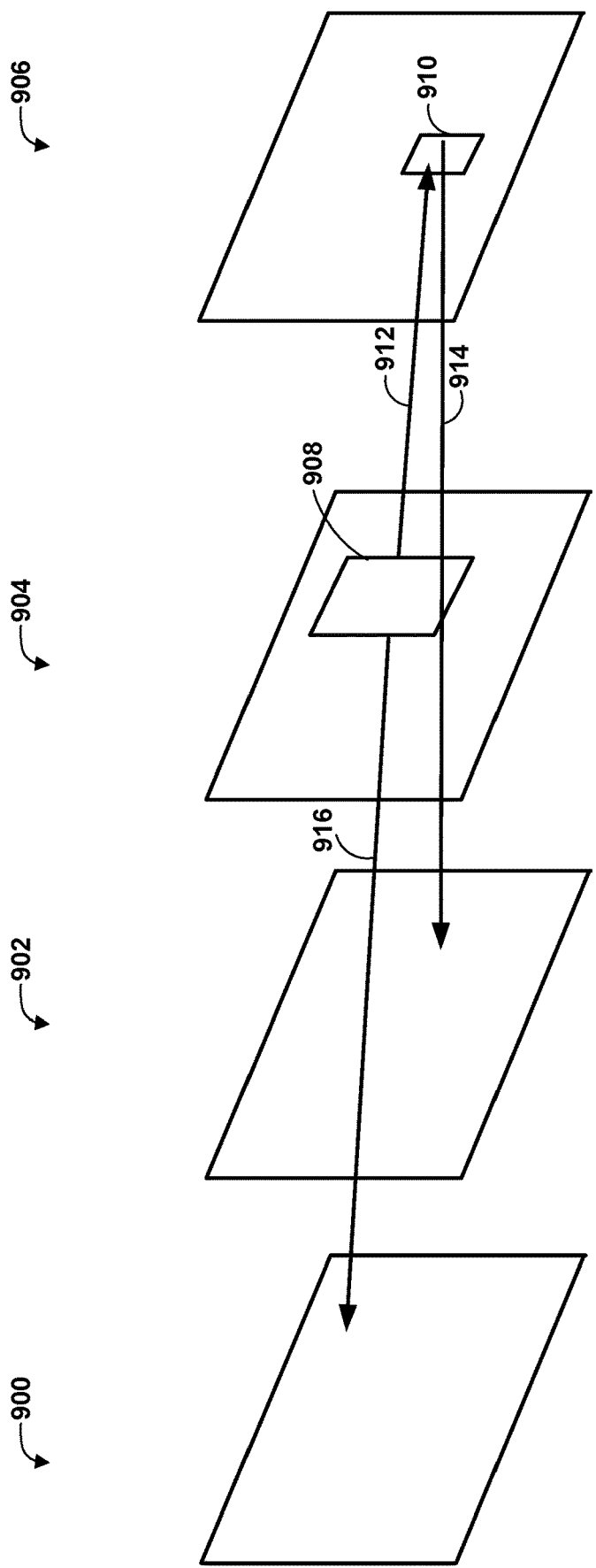
FIG. 6 is a conceptual diagram illustrating relevant pictures in advanced temporal motion vector prediction (ATMVP).

FIG. 6 is a conceptual diagram illustrating relevant pictures in ATMVP (similar to TMVP). In particular, FIG. 6 illustrates current picture 904, motion source picture 906, and reference pictures 900, 902. More particularly, current picture 904 includes current block 908. Temporal motion vector 912 identifies corresponding block 910 of motion source picture 906 relative to current block 908. Corresponding block 910, in turn, includes motion vector 914, which refers to reference picture 902 and acts as an advanced temporal motion vector predictor for at least a portion of current block 908, e.g., a sub-PU of current block 908. That is, motion vector 914 may be added as a candidate motion vector predictor for current block 908. If selected, at least a portion of current block 908 may be predicted using a corresponding motion vector, namely, motion vector 916, which refers to reference picture 900.

History-based motion vector prediction (HMVP) (e.g., as described in L. Zhang, K. Zhang, H. Liu, Y. Wang, P. Zhao, and D. Hong, "CE4-related: History-based Motion Vector Prediction", JVET-K0104, July, 2018) is a history-based method in which video encoder 200 and video decoder 300 determine an MV predictor for each block from a list of MVs decoded from the past in addition to those MVs in immediately adjacent causal neighboring motion fields. HMVP involves keeping a table for previously decoded motion vectors as HMVP candidates.

Video encoder 200 and video decoder 300 maintain a table with multiple HMVP candidates during the encoding/decoding process. Maintaining the table may include adding HMVP candidates to the table as well as removing HMVP candidates from the table. Video encoder 200 and video decoder 300 may be configured to empty the table (e.g., remove the HMVP candidates) when a new slice is encountered. Whenever there is an inter-coded block, video encoder 200 and video decoder 300 may be configured to insert the associated motion information into the table in a first-in-first-out (FIFO) fashion as a new HMVP candidate. Then, video encoder 200 and video decoder 300 may be configured to apply a constraint FIFO rule. When inserting an HMVP candidate to the table, video encoder 200 and video decoder 300 may be configured to first apply a redundancy check (e.g., pruning) to determine whether there is an identical HMVP candidate in the table. If found, video encoder 200 and video decoder 300 may be configured to remove that particular HMVP candidate from the table and all the HMVP candidates after that candidate are moved.

Video encoder 200 and video decoder 300 may be configured to use HMVP candidates in the merge candidate list construction process. For example, video encoder 200 and video decoder 300 may be configured to insert all HMVP candidates from the last entry to the first entry in the table after the TMVP candidate. Video encoder 200 and video decoder 300 may be configured to apply pruning on the HMVP candidates. Once the total number of available merge candidates reaches the signaled or predetermined maximum number of allowed merge candidates, video encoder 200 and video decoder 300 may be configured to terminate the merge candidate list construction process.

Similarly, video encoder 200 and video decoder 300 may be configured to use HMVP candidates in the AMVP candidate list construction process. Video encoder 200 and video decoder 300 may be configured to insert the motion vectors of the last K HMVP candidates in the table after the TMVP candidate. Video encoder 200 and video decoder 300 may be configured to use only HMVP candidates with the same reference picture as the AMVP target reference picture to construct the AMVP candidate list. Video encoder 200 and video decoder 300 may be configured to apply pruning on the HMVP candidates.

Figure 7:
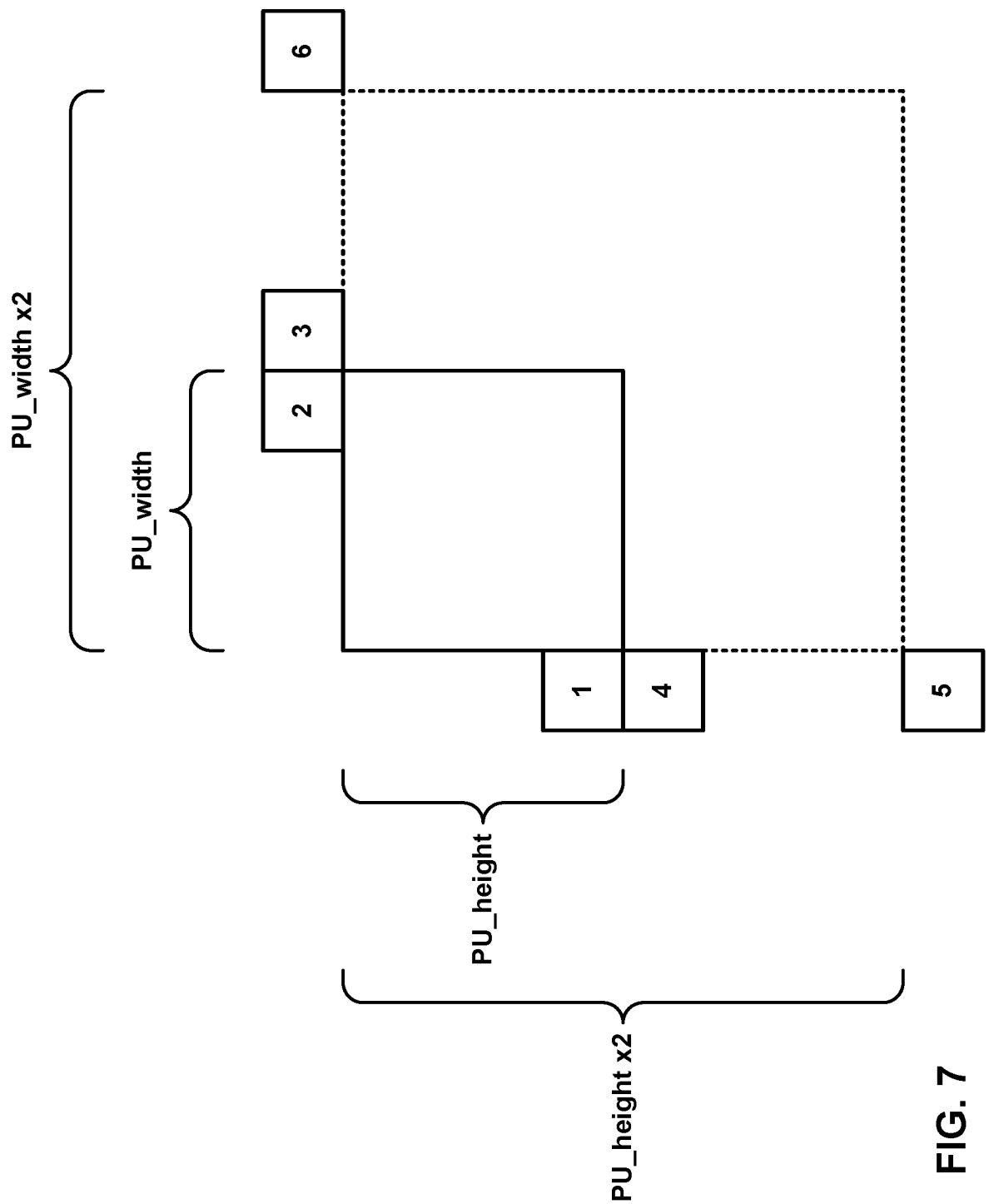
FIG. 7 is a conceptual diagram illustrating derivation of non-sub-PU spatial-temporal motion vector predictor.

Non-sub-PU spatial-temporal motion vector predictor (STMVP) prediction mode is proposed for the future generation of video coding standard (VVC). FIG. 7 is a conceptual diagram illustrating derivation of non-sub-PU spatial-temporal motion vector predictor. The video coder (e.g., video encoder 200 and/or video decoder 300) may check at most two of the positions for above position: (PU_width−1, −1) and (PU_width×2, −1)) and left position: (−1, PU_height−1), (−1, PU_height×2)). The video coder may generate the non-sub-PU STMVP by averaging three candidates which include two spatial candidates and one temporal candidates. If only two or one of the candidates is available, then the video coder may generate the STMVP by averaging the two available candidates, or just use one motion vector.

A simplified STMVP design was proposed in Y.-H. Chao, Y. Han, D. Rusanovskyy, W.-J. Chien, M. Karczewicz, CE4: STMVP simplification (test 4.2.3a), JVET-M0221 (hereinafter "JVET-M0221"), where number of spatial neighbor checked as input to STMVP derivation is limited to two, one above spatial neighbor and one left neighbor. The neighbor checked are (PU_width−1, −1) or (PU_width×2, −1) for above neighbor and only check (−1, PU_height−1) or (−1, PU_height×2) for left neighbor.

A derivation process for STMVP output is defined as following:

$$P^{STMVP} = (MV^{S\text{-}Above} + MV^{S\text{-}Left} + 2*MV^T)/4$$

The multiplier and denominator are both of values equivalent to a power of 2 and therefore can be easily implemented in hardware by bit shift.

The multiplier and denominator are both of values equivalent to a power of 2 and therefore can be easily implemented in hardware by bit shift. It was proposed to place STMVP candidate at the fifth ($5^{th}$) potential position in the MERGE/AMVP candidate list position, following A0, A1, B1, B0 candidate positions (if they are available). Note, if any of spatial candidate happen to not be available, the STMVP entry position index in the candidate list will be smaller than five (5).

An example of the proposed merge list construction process in VVC Draft 4 is shown below, with the STMVP aspects being bookended by asterisk (*) symbols.
  a. Spatial candidates for blocks A1, B1, B0 and A0.
  b. *STMVP candidate $MV_{STMVP}$*
  c. If number of candidates less than 4, add B2.
  d. TMVP candidate.
  e. HMVP candidates.
  f. Pairwise candidates.
  g. Zero candidates.

It was also proposed, that pruning process on STMVP candidate to be performed by the redundancy check for STMVP output and STMVP input MVPs.

```
bool stmvpAvail = true;
for (unsigned uiIdx = 0; uiIdx < count; uiIdx++)
{
    if (mrgCtx.mrgTypeNeighbours[uiIdx] != MRG_TYPE_SUBPU_ATMVP)
    {
        if (mrgCtx.interDirNeighbours[uiIdx] == mi.interDir &&
            mrgCtx.mvFieldNeighbours[(uiIdx << 1)] == MvField(mi.mv[0], mi.refIdx[0]) &&
            mrgCtx.mvFieldNeighbours[(uiIdx << 1) + 1] == MvField(mi.mv[1], mi.refIdx[1]))
        {
            stmvpAvail = false;
            break;
        }
    }
}
```

MVP utilized in the merge mode of the MPEG5 Essential Video Coding (EVC) WD1, considers the following motion vector candidates: a) 4 spatial candidates A1, B1, B0, A0 and B2; b) TMVP candidate; c) HMVP candidates; d) synthetic bi-candidates; and e) Zero candidates. In some examples, additional synthetic pair-wise motion vector candidate can provide additional coding gain.

This disclosure proposes several improvements to the TMVP design that may solve the aforementioned problems. Any of the improvements described herein may be used independently or in combination.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with a first technique, a video coder (e.g., video encoder 200 and/or video decoder 300) may derive TMVP candidate as a scaled version of the MV of the collocated block. Example implementation of the scaling process is shown below:

The variable refPicListCol[refIdxCol] is set to be the picture with reference index refIdxCol in the reference picture list listCol of the slice containing prediction block colPb in the collocated picture specified by ColPic, and the following applies:

The POC distance (denoted as currPocDiffX) between current picture and current picture's reference picture list RefPicListX[refIdxLX] with refIdxLX is equal to 0, is computed as following:

$$currPocDiffLX = DiffPicOrderCnt(currPic, RefPicListX[refIdxLX]) \qquad (3\text{-}300)$$

The POC distance between the collocated picture ColPic and the list X reference picture of the collocated picture refPicListCol[refIdxLXCol] is denoted as colPocDiffLX and computed as following:

$$colPocDiffLX = DiffPicOrderCnt(ColPic, refPicListCol[refIdxLXCol]) \qquad (3\text{-}19)$$

For valid refIdxColLX, the variable availableFlagLXCol is set equal to 1, the mvLXCol is derived as a scaled version of the motion vector mvCoLX as follows:

$$distScaleFactorLX = currPocDiffLX << 5 / colPocDiffLX \qquad (3\text{-}2)$$

$$mvLXCol = Clip3(-32768, 32767, Sign(distScaleFactorLX*mvCol)*((Abs(distScaleFactorLX*mvCol)+16)>>5)) \qquad (3\text{-}3)$$

with X being 0 or 1 specifying reference list 0 and reference list 1, respectively.

dptr[REFP_0]=ptr−refp[0][REFP_0].ptr;
dptr[REFP_1]=refp[0][REFP_1].ptr−ptr;

In accordance with a second technique, a video coder (e.g., video encoder 200 and/or video decoder 300) may derive TMVP with following parameters of scaling (colPocDiffLX, currPocDiffLX). An example implementation of the derivation is shown below:

The variables mvLXCol and availableFlagLXCol, for X being equal 0 or 1, are derived as follows:

If colCb is coded in an intra prediction mode, both components of mvLXCol are set equal to 0 and availableFlagLXCol is set equal to 0.

Otherwise, the motion vector mvCol, the reference index refIdxCol and the reference list identifier listCol are derived as follows:

If predFlagL0Col[x][y] is equal to 0, and predFlagL1Col[x][y] is equal to 1, mvCol, refIdxCol and listCol are set equal to mvLXCol[xColCb][yColCb], refIdxLXCol[xColCb][yColCb] and LX with X is equal to 1, respectively If predFlagL0Col[x][y] is equal to 1, and predFlagL1Col[x][y] is equal to 0, mvCol, refIdxCol and listCol are set equal to mvLXCol[xColCb][yColCb], refIdxLXCol[xColCb][yColCb] and LX with X is equal to 0, respectively.

Otherwise (predFlagL0Col[x][y] is equal to 1, and predFlagL1Col[x][y] is equal to 1), mvCol, refIdxCol and listCol are set equal to mvLXCol[xColCb][yColCb], refIdxLXCol[xColCb][yColCb] and LX respectively.

and mvLXCol and availableFlagLXCol are derived as follows:

currPocDiffLX = DiffPicOrderCnt( currPic, RefPicListX[ refIdxLX ] )   (3-300)
colPocDiffLX = DiffPicOrderCnt( ColPic, refPicListCol[ refIdxLXCol ] ) (3-49)
dptr_co[REFP_0] = colPic.ptr − colPic.list_ptr[map_refi_co[neb_addr_coll][REFP_0]];
dptr_co[REFP_1] = colPic.list_ptr[map_refi_co[neb_addr_coll][REFP_1]] − colPic.ptr;

-continued

```
for (int lidx = 0; lidx < REFP_NUM; lidx++)
{
    if (REFI_IS_VALID(map_refi_co[neb_addr_coll][lidx]))
    {
        if (dptr_co[lidx] != 0)
        {
            int ratio_tmvp = ((dptr[lidx]) << MVP_SCALING_PRECISION) / dptr_co[lidx];
            ver_refi[lidx] = 0; // ref idx
            s16 *mvc = colPic.map_mv[neb_addr_coll][lidx];
            scaling_mv(ratio_tmvp, mvc, mvp[lidx]);
        }
    }
}
```

In accordance with a third technique, a video coder (e.g., video encoder 200 and/or video decoder 300) may derive TMVP with following parameters of scaling (colPocDiffLX, currPocDiffLX). An example implementation of the scaling process is shown below:

The variables mvLXCol and availableFlagLXCol, for X being equal 0 or 1, are derived as follows:

If colCb is coded in an intra prediction mode, both components of mvLXCol are set equal to 0 and availableFlagLXCol is set equal to 0.

Otherwise, the motion vector mvCol, the reference index refIdxCol and the reference list identifier listCol are derived as follows:

If predFlagLXCol[x][y] is equal to 1, mvCol, refIdxCol and listCol are set equal to mvLXCol[xColCb][yColCb], refIdxLXCol[xColCb][yColCb] and LX with X is equal to col_source_mvp_list_idx, respectively.

and mvLXCol and availableFlagLXCol are derived as follows:
s8 refidx=map_refi_co[neb_addr_coll][collocated_mvp_source_list_idx];
dptr_co[REFP_0]=colPic.ptr−colPic.list_ptr[refidx];

In some examples of the third technique, the video coder may produce the bi-prediction TMVP from uni-predictional MVC of MVC. For instance, the video coder may derive the MVC and POC of current picture and POC of the collocated picture dptr[REFP_0] and dptr_co[REFP_0] from LIST0 of collocated block and use these values to derive scaled MVP. The video coder may use the resulting scaled MVP to produce MVP in LIST0 (mvp[REFP_0]) and LIST1 (mvp[REFP_1]) of the TMVP output by scaling the co-located motion vector (mvc) take with different sign.
s16*mvc=colPic.map_mv[neb_addr_coll][collocated_mvp_source_list_idx]; int ratio_tmvp=((dptr[REFP_0])<<MVP_SCALING_PRECISION)/dptr_co[REFP_0]; scaling_mv(ratio_tmvp, mvc, mvp[REFP_0]);
ratio_tmvp=((dptr[REFP_1])<<MVP_SCALING_PRECISION)/dptr_co[REFP_0]; scaling_mv(−ratio_tmvp, mvc, mvp[REFP_1]);
mvLXCol[xColCb][yColCb] from col_source_mvp_list_idx list and assigned to two lists:
    mvCol0=mvLXCol[xColCb][yColCb] from col_source_mvp_list_idx list
    mvCol1=mvLXCol[xColCb][yColCb] from col_source_mvp_list_idx list In accordance with a fourth technique, a video coder (e.g., video encoder 200 and/or video decoder 300) may signal (e.g., encode and decode) parameters of TMVP derivation. As one example, the video coder may signal parameters of the TMVP derivation. As another example, the video coder may control derivation flow. For instance, the video coder may switch between TMVP derivation by alternative methods (e.g., between any of the first, second, or third techniques described above).

An example syntax table for the parameters of the TMVP derivation is provided below (additions are shown in italics):

Tile Group Header Syntax

|  | Descriptor |
|---|---|
| tile_group_header( ) { |  |
|     tile_group_pic_parameter_set_id | ue(v) |
|     single_tile_in_tile_group_flag | u(1) |
|     first_tile_id | u(v) |
| ... |  |
|     if( tile_group_type == P \|\| |  |
|     tile_group_type == B ){ |  |
| ... |  |
|         temporal_mvp_asigned_flag | u(1) |
|         if( temporal_mvp_asigned_flag ){ |  |
|             if( tile_group_type == B ){ |  |
|                 col_pic_list_idx | u(1) |
|                 col_source_mvp_list_idx | u(1) |
|             } |  |
|             col_pic_ref_idx | ue(v) |
|         } |  |
|     } |  |

Example semantics or the syntax elements in the above syntax table are provided below.

temporal_mvp_asigned_flag specifies whether temporal motion vector predictors derivation process is to be configured with additional parameters signaled in the bitstream. When not present, the value of temporal_mvp_asigned_flag is inferred to be equal to 0.

col_pic_list_idx specifies the reference picture list for derivation of collocated picture for purposes of temporal motion vector prediction. When col_pic_list_idx is not present, and slice_type is equal to P the col_pic_list_idx is inferred to be equal to 0. When col_pic_list_idx is not present, and slice_type is equal to B the col_pic_list_idx is inferred to be equal to 1.

col_pic_ref_idx specifies the reference index of the collocated picture used for temporal motion vector prediction. collocated_ref_idx refers to a picture in RefPicList[col_pic_list_idx], and the value of collocated_ref_idx shall be in the range of 0 to num_ref_idx_active_minus1[col_pic_list_idx], inclusive. When col_pic_ref_idx is not present, col_pic_ref_idx is inferred to be equal to 0.

col_source_mvp_list_idx specifies the reference picture list for derivation of motion vector candidate for purposes of temporal motion vector prediction. When col_source_mvp_list_idx is not present, col_source_mvp_list_idx is inferred to be equal to 0. tile_group_deblocking_filter_flag equal to 1 specifies that the operation of the deblocking filter is applied for the current tile group. tile_group_deblocking_filter_flag equal to 0 specifies that the operation of the deblocking filter is not applied for the current tile group.

In accordance with a fourth technique, a video decoder (e.g., video decoder 300) may derive which TMVP derivation method (e.g., which of the first, second, or third techniques described above) is to be used. In some examples, the video decoder can employ a derivation process to select for TMVP method suitable for current slice and parsing process of the bitstream. Non-limiting examples of such derivation process are provided below:

As a first example process for deriving which TMVP derivation method is used, the video decoder may compute a POC distance between current picture ptr and target picture for TMVP scaling in each of the reference picture list (REFP_0 and REFP_1).

dptr[REFP_0]=ptr−refp[0][REFP_0].ptr;
dptr[REFP_1]=refp[0][REFP_1].ptr−ptr;

As a second example process for deriving which TMVP derivation method is used, the video decoder may identify if both target pictures for MV scaling are in the same prediction direction (e.g., if the POC of each target picture is smaller than POC of current picture):

```
test_result = (dptr[REFP_0] > 0) && (-dptr[REFP_1] > 0);
if (test_result)
    Apply TMVP method1 (e.g. in clause 2)
Else
    Apply TMVP method2 (e.g. in clause 3)
```

| If( ((dptr[REFP_0] > 0) && (-dptr[REFP_1] > 0)) == 0){ | |
|---|---|
|   if( tile_group_type = = B ) { | |
|     col_pic_list_idx | u(1) |
|     col_source_mvp_list_idx | u(1) |
|   } | |
|   col_pic_ref_idx | ue(v) |
| } | |

Alternatively, in some examples, the video decoder can check if both target picture for MV scaling are in the same prediction direction (e.g. if the POC of each target picture is smaller than POC of current picture or both POC are larger then POC of current picture):

```
test_result = (dptr[REFP_0] > 0) == (-dptr[REFP_1] > 0);
if (test_result)
    Apply TMVP method1 (e.g. in clause 2)
Else
```

| If ( test_result == 0){ | |
|---|---|
|   if( tile_group_type = = B ) { | |
|     col_pic_list_idx | u(1) |
|     col_source_mvp_list_idx | u(1) |
|   } | |
|   col_pic_ref_idx | ue(v) |
| } | |

In one example, the techniques of this disclosure may be implemented as follows:

| if( tile_group_type = = P | | tile_group_type = = B ) { | |
|---|---|
|   temporal_mvp_asigned_flag | u(1) |

| -continued | |
|---|---|
| if(temporal_mvp_asigned_flag) { | |
|   if( tile_group_type = = B ) { | |
|     col_pic_list_idx | u(1) |
|     col_source_mvp_list_idx | u(1) |
|   } | |
|   col_pic_ref_idx | ue(v) |
| } | |
| } | | temporal_mvp_asigned_flag specifies whether temporal motion vector predictors derivation process is to be configured with additional parameters signaled in the bitstream. When not present, the value of temporal_mvp_asigned_flag is inferred to be equal to 0.

col_pic_list_idx specifies the reference picture list for derivation of collocated picture for purposes of temporal motion vector prediction. When col_pic_list_idx is not present, and slice_type is equal to P the col_pic_list_idx is inferred to be equal to 0. When col_pic_list_idx is not present, and slice_type is equal to B the col_pic_list_idx is inferred to be equal to 1.

col_pic_ref_idx specifies the reference index of the collocated picture used for temporal motion vector prediction. collocated_ref_idx refers to a picture in RefPicList[col_pic_list_idx], and the value of collocated_ref_idx shall be in the range of 0 to num_ref_idx_active_minus1[col_pic_list_idx], inclusive. When col_pic_ref_idx is not present, col_pic_ref_idx is inferred to be equal to 0.

col_source_mvp_list_idx specifies the reference picture list for derivation of motion vector candidate for purposes of temporal motion vector prediction. When col_source_mvp_list_idx is not present, col_source_mvp_list_idx is inferred to be equal to 0.

Decoding Process for No Backward Prediction Flag and Collocated Picture

This process is invoked at the beginning of the decoding process for each P or B slice (or tiles group), after decoding of the slice (or tiles group) header as well as the invocation of the decoding process for reference picture set as specified in clause 8.3.3 and the invocation of the decoding process for reference picture list construction for the slice (or tiles group) as specified in clause 8.3.2, but prior to the decoding of any coding unit. The variable ColPic is set equal to RefPicList[col_pic_list_idx][col_pic_ref_idx].

Derivation Process for Collocated Motion Vectors
Inputs to this process are:
a variable currCb specifying the current coding block,
a variable colCb specifying the collocated coding block inside the collocated picture specified by ColPic,
a luma location (xColCb, yColCb) specifying the top-left sample of the collocated luma coding block specified by colCb relative to the top-left luma sample of the collocated picture specified by ColPic,
a reference index refIdxLX, with X being 0 or 1, Outputs of this process are:
the motion vector prediction mvLXCol in 1/16 fractional-sample accuracy, with X is being equal 0 or 1
the availability flag availableFlagCol (jointly for lists 0 and 1).
The variable currPic specifies the current picture.
The arrays predFlagL0Col[x][y], mvL0Col[x][y] and refIdxL0Col[x][y] are set equal to PredFlagL0[x][y], MvL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvL1[x][y] and RefIdxL1[x][y], respectively, of the collocated picture specified by ColPic.

The variables mvLXCol and availableFlagLXCol, for X being equal 0 or 1, are derived as follows:

If colCb is coded in an intra prediction mode, both components of mvLXCol are set equal to 0 and availableFlagLXCol is set equal to 0.

Otherwise, the motion vector mvCol, the reference index refIdxCol and the reference list identifier listCol are derived as follows:

If temporal_mvp_asigned_flag is equal to 0, the following is applied:
  If predFlagL0Col[x][y] is equal to 0, and predFlagL1Col[x][y] is equal to 1, mvCol, refIdxCol and listCol are set equal to mvLXCol[xColCb][yColCb], refIdxLXCol[xColCb][yColCb] and LX with X is equal to 1, respectively.
  If predFlagL0Col[x][y] is equal to 1, and predFlagL1Col[x][y] is equal to 0, mvCol, refIdxCol and listCol are set equal to mvLXCol[xColCb][yColCb], refIdxLXCol[xColCb][yColCb] and LX with X is equal to 0, respectively.
  Otherwise (predFlagL0Col[x][y] is equal to 1, and predFlagL1Col[x][y] is equal to 1), mvCol, refIdxCol and listCol are set equal to mvLXCol [xColCb][yColCb], refIdxLXCol[xColCb][yColCb] and LX respectively.

If temporal_mvp_asigned_flag is equal to 1, the following is applied:
  If predFlagLXCol[x][y] with X equal to collocated_mvp_source_list_idx is equal to 1, mvCol, refIdxCol and listCol are set equal to mvLXCol [xColCb][yColCb], refIdxLXCol[xColCb][yColCb] and LX with X is equal to col_source_mvp_list_idx, respectively.

mvLXCol and availableFlagLXCol are derived as follows:

The variable refPicListCol[refIdxCol] is set to be the picture with reference index refIdxCol in the reference picture list listCol of the slice containing prediction block colPb in the collocated picture specified by ColPic, and the following applies:

The POC distance (denoted as currPocDiffX) between current picture and current picutre's reference picture list RefPicListX[refIdxLX] with refIdxLX is equal to 0, is computed as following:

currPocDiffLX=DiffPicOrderCnt(currPic,RefPicListX
  [refIdxLX])     (8-300)

The POC distance (denoted as colPocDiffLX) between the collocated picture CoPic and the list X reference picture of the collocated picture refPicListCol[refIdxLXCol] is computed as following:

colPocDiffLX=DiffPicOrderCnt(ColPic,refPicListCol
  [refIdxLXCol])     (8-299)

For valid refIdxCol and colPocDiffLX is not equal to 0, the variable availableFlagLXCol is set equal to 1, the mvLXCol is derived as a scaled version of the motion vector mvColLX as follows:

distScaleFactorLX=currPocDiffLX<<5/colPocDiffLX     (8-294)

mvLXCol=Clip3(−32768,32767,Sign
  (distScaleFactorLX*mvCol)*((Abs
  (distScaleFactorLX*mvCol)+16)>>5))     (8-296)

Otherwise (invalid refIdxCol or colPocDiffLX is equal to 0) the variable availableFlagLXCol is set equal to 0 and mvLXCol=0     (8-297)

with X being 0 or 1 specifying reference list 0 and reference list 1, respectively.

The picture boundary based clipping process for variables for collocated motion vectors mvLXCol is invoked as specified in clause 8.5.2.21 with mvLXCol, (xCb, yCb), pic_width_in_luma_samples and pic_height_in_luma_samples as input parameters.

The availableFlagCol is derived as following:
  If availableFlagLXCol for X being 0 and 1 are both valid, availableFlagCol is set to 3,
  Otherwise if availableFlagLXCol for X being equal to 0 is valid and availableFlagLXCol for X being 1 is invalid, availableFlagCol is set to 1,
  Otherwise if availableFlagLXCol for X being equal to 1 is valid and availableFlagLXCol for X being 0 is invalid, availableFlagCol is set to 2,
  Otherwise, availableFlagCol is set to 0.

It is noted that references to tile groups may be considered to be references to VVC Draft 4 while references to slices may be considered references to VVC Draft 5. As such, the being included in a tile group header may, in some examples, be included in a slice header or a header of any similar partition.

In accordance with the techniques of this disclosure, a video coder (e.g., video encoder 200 and/or video decoder 300) may derive, for a current block of a current picture of video data, a temporal motion vector prediction (TMVP) candidate; generate, for the current block, a list of motion vector candidates, the list including the derived TMVP candidate; and predict, based on the list of motion vector candidates, the current block.

Figure 8A:
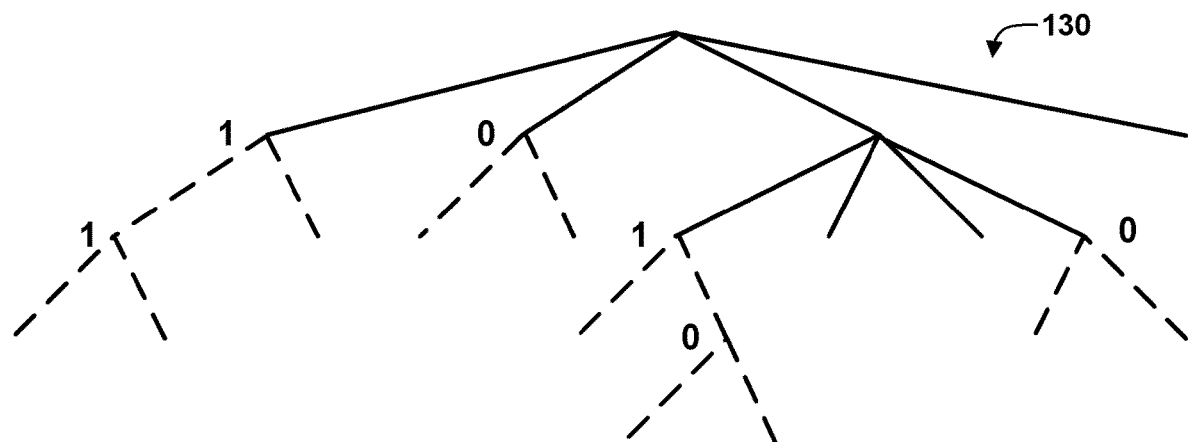
FIGS. 8A and 8B are conceptual diagrams illustrating an example quadtree binary tree (QTBT) structure, and a corresponding coding tree unit (CTU).
Figure 8B:
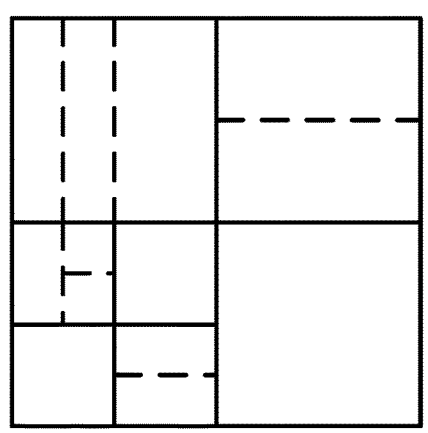

FIGS. 8A and 8B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 8B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 9:
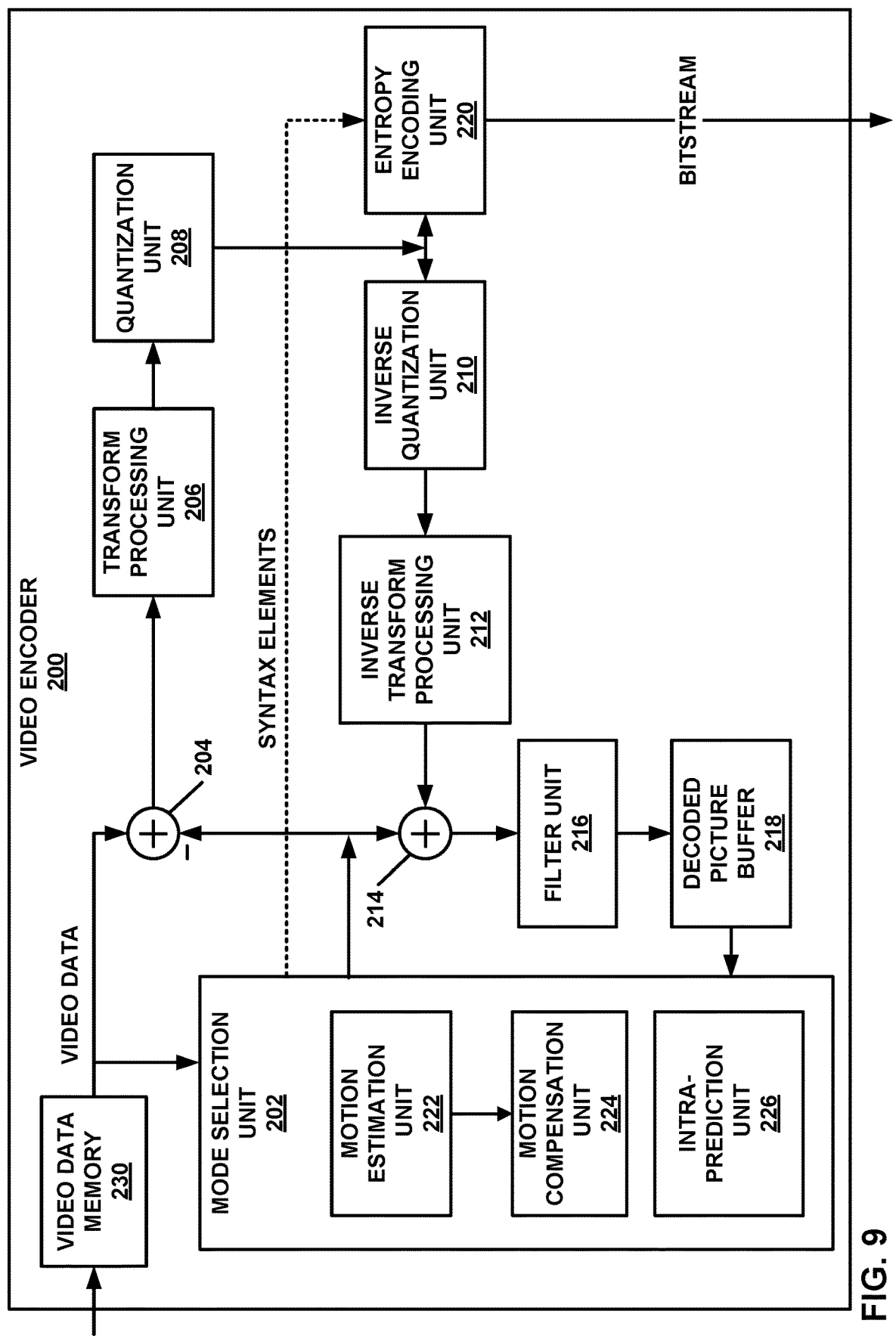
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 in the context of video coding standards such as the HEVC video coding standard and the EVC and VVC video coding standards in development. However, the techniques of this disclosure are not limited to these video coding standards, and are applicable generally to video encoding and decoding.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As discussed above, a video coder, such as video encoder 200 or video decoder 300, may generate a motion vector candidate list, with, in some examples, at least one candidate in the list being a temporal motion vector predictor (TMVP) candidate. In some examples, the video coder may determine the TMVP candidate using inferred parameters such that the video coder derives the TMVP candidate from a co-located PU in a co-located picture. For instance, to determine the TMVP candidate using inferred parameters, the video coder may determine the TMVP candidate in accordance with the technique described above with reference to FIGS. 3A and 3B. However, in some examples, the TMVP candidate derived using inferred parameters may not be the best TMVP candidate. For instance, other motion vectors from other pictures may identify reference blocks with samples that more closely match samples of a current block. Having a reference block with samples that more closely match samples of a current block may improve coding efficiency by reducing the size of residual data.

In accordance with one or more techniques of this disclosure, the derivation of TMVP candidates may be made more flexible. For instance, as opposed to inferring parameters that control TMVP candidate derivation (the TMVP parameters), a video coder may explicitly signal parameters that control TMVP candidate derivation. Some example parameters that may be signaled include a reference picture list for derivation of a collocated picture for derivation of the TMVP candidate, a reference index of the collocated picture, and a reference picture list for derivation of a motion vector candidate for derivation of the TMVP candidate. By explicitly signaling the parameters, the video encoder may be able to select a TMVP candidate that identifies a reference block with samples that more closely match samples of a current block. For instance, the video coder may select a reference picture list for derivation of a collocated picture for derivation of the TMVP candidate, or any other parameter(s), that is different than the reference picture list that would be used with inferred parameters. The resulting reduction in residual data size may be more that the data used to signal the TMVP parameters. In this way, the techniques of this disclosure may improve coding efficiency (e.g., by reducing the amount of data used to encode video data).

In some examples, video encoder 200 may signal the parameters by signaling a plurality of syntax elements that each specify one or more parameters of a TMVP candidate derivation process. For instance, mode selection unit 202 may cause entropy encoding unit 220 to encode the plurality of syntax elements in a coded video bitstream. The plurality of syntax elements that specify one or more parameters of the TMVP candidate derivation process may include one or more of a syntax element that specifies a reference picture list for derivation of a collocated picture for derivation of the TMVP candidate (a col_pic_list_idx); a syntax element that specifies a reference index of the collocated picture (col_pic_ref_idx); and/or a syntax element that specifies a reference picture list for derivation of a motion vector candidate for derivation of the TMVP candidate (col_source_mvp_list_idx).

In some examples, video encoder 200 may selectively signal the TMVP parameters (e.g., selectively signal the plurality of syntax elements that each specify one or more parameters of a TMVP candidate derivation process). For instance, as opposed to always inferring the TMVP parameters or always explicitly signalling the TMVP parameters, the video coder may signal a syntax element that indicates whether or not the TMVP parameters are explicitly signalled (e.g., temporal_mvp_asigned_flag). Where the syntax element indicates that the TMVP parameters are explicitly signalled, the video coder may code a plurality of syntax elements that specify the TMVP parameters. Otherwise (e.g., where the syntax element does not indicate that the TMVP parameters are explicitly signalled), the video coder may infer the TMVP parameters (e.g., determine the TMVP parameters without explicit signaling). In some examples, mode select unit 202 of video encoder 200 may select to infer, and cause a decoder to infer, the TMVP parameters where the amount of data to explicitly signal TMVP parameters would be greater than the amount of data saved by using a TMVP candidate other than the TMVP candidate derived based on the inferred TMVP parameters. In this way, the techniques of this disclosure may improve coding efficiency (e.g., by reducing the amount of data used to encode video data).

The following syntax and semantics are one example of how video encoder 200 may signal the plurality of syntax elements in a coded video bitstream. In the below example, the plurality of syntax elements are signalled in a tile group header syntax. However, in other examples, the plurality of syntax elements may be signaled in other syntax structures, such as slice headers, picture headers, coding units, or any other syntax structure.

Tile Group Header Syntax

| | Descriptor |
|---|---|
| tile_group_header( ) { | |
|     tile_group_pic_parameter_set_id | ue(v) |
|     single_tile_in_tile_group_flag | u(1) |
|     first_tile_id | u(v) |
| ... | |
|     if( tile_group_type = = P \| \| tile_group_type = = B ) { | |
| ... | |
|         temporal_mvp_asigned_flag | u(1) |
|         if(temporal_mvp_asigned_flag) { | |
|             if( tile_group_type = = B ) { | |
|                 col_pic_list_idx | u(1) |
|                 col_source_mvp_list_idx | u(1) |
|             } | |
|             col_pic_ref_idx | ue(v) |
|         } | |
|     } | | temporal_mvp_asigned_flag specifies whether temporal motion vector predictors derivation process is to be configured with additional parameters signaled in the bitstream. When not present, the value of temporal_mvp_asigned_flag is inferred to be equal to 0.

col_pic_list_idx specifies the reference picture list for derivation of collocated picture for purposes of temporal motion vector prediction. When col_pic_list_idx is not present, and slice_type is equal to P the col_pic_list_idx is inferred to be equal to 0. When col_pic_list_idx is not present, and slice_type is equal to B the col_pic_list_idx is inferred to be equal to 1.

col_pic_ref_idx specifies the reference index of the collocated picture used for temporal motion vector prediction. collocated_ref_idx refers to a picture in RefPicList[col_pic_list_idx], and the value of collocated_ref_idx shall be in the range of 0 to num_ref_idx_active_minus1[col_pic_list_idx], inclusive. When col_pic_ref_idx is not present, col_pic_ref_idx is inferred to be equal to 0.

col_source_mvp_list_idx specifies the reference picture list for derivation of motion vector candidate for purposes of temporal motion vector prediction. When col_source_mvp_list_idx is not present, col_source_mvp_list_idx is inferred to be equal to 0.

Video encoder 200 represents an example of a device configured to encode video data including a memory configured to store video data, and one or more processing units implemented in circuitry and configured to encode, via a coded video bitstream, a syntax element that specifies whether the coded video bitstream includes a plurality of syntax elements that specify parameters of a temporal motion vector prediction (TMVP) candidate derivation process; where the syntax element specifies that the coded video bitstream includes the plurality of syntax elements: encode the plurality of syntax elements via the coded video bitstream; and derive, by the video coder and based on parameters specified by the plurality of syntax elements, a TMVP candidate for a current block of a current picture of video data; generate, for the current block, a list of motion vector candidates, the list including the derived TMVP candidate; and predict, based on the list of motion vector candidates, the current block.

Figure 10:
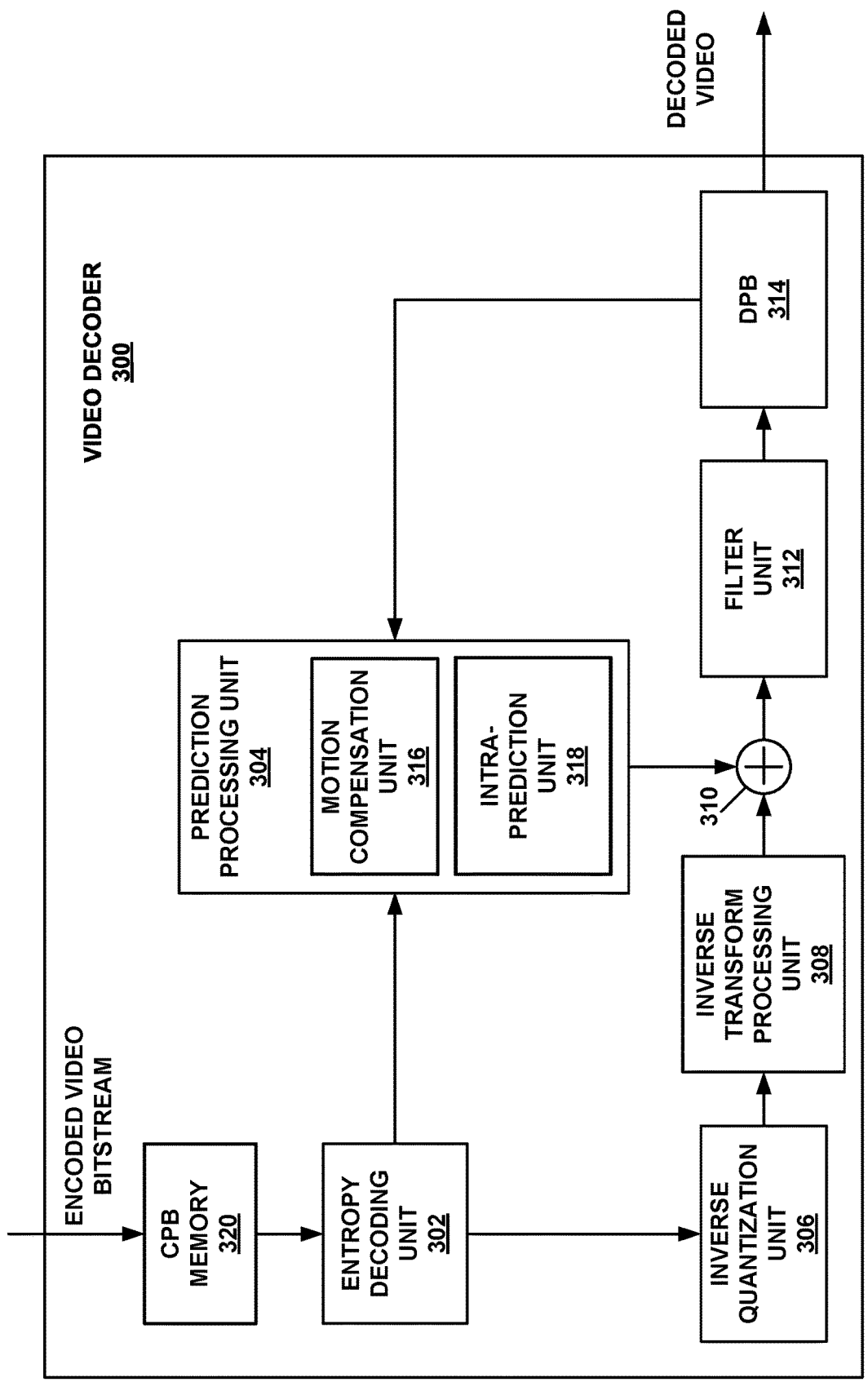
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of EVC, JEM, VVC, and HEVC. However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In accordance with one or more techniques of this disclosure, video decoder 300 may perform a reciprocal process for deriving a TMVP candidate as video encoder 200. For instance, entropy decoding unit 302 may decode, from a coded video bitstream, a plurality of syntax elements that each specify one or more parameters of a TMVP candidate derivation process. For instance, entropy decoding unit 302 may decode and provide to prediction processing unit 304 values for one or more of a syntax element that specifies a reference picture list for derivation of a collocated picture for derivation of the TMVP candidate (a col_pic_list_idx); a syntax element that specifies a reference index of the collocated picture (col_pic_ref_idx); and/or a syntax element that specifies a reference picture list for derivation of a motion vector candidate for derivation of the TMVP candidate (col_source_mvp_list_idx).

Prediction processing unit 304 may derive, based on values of the parameters specified by the plurality of syntax elements, a TMVP candidate for a current block of a current picture of video data. Prediction processing unit 304 may insert the derived TMVP candidate into a list of motion vector candidates and predict, based on the list of motion vector candidates, the current block of video data.

Similar to video encoder 200, video decoder 300 may selectively derive the TMVP candidate based on explicitly signalled parameters or derive the TMVP candidate based on inferred parameters. For instance, depending on the value of a controlling syntax element (e.g., temporal_mvp_asigned_flag), video decoder 300 may either decode the plurality of syntax elements and derive the TMVP candidate based on explicitly signalled parameters specified by the plurality of syntax elements or not decode the plurality of syntax elements and derive the TMVP candidate based on inferred (i.e., not explicitly signalled) parameters.

In this manner, video decoder 300 represents an example of a video decoding device including a memory configured to store video data, and one or more processing units implemented in circuitry and configured to decode, via a coded video bitstream, a syntax element that specifies whether the coded video bitstream includes a plurality of syntax elements that specify parameters of a temporal motion vector prediction (TMVP) candidate derivation process; where the syntax element specifies that the coded video bitstream includes the plurality of syntax elements: decode the plurality of syntax elements via the coded video bitstream; and derive, based on parameters specified by the plurality of syntax elements, a TMVP candidate for a current block of a current picture of video data; generate, for the current block, a list of motion vector candidates, the list including the derived TMVP candidate; and predict, based on the list of motion vector candidates, the current block.

Figure 11:
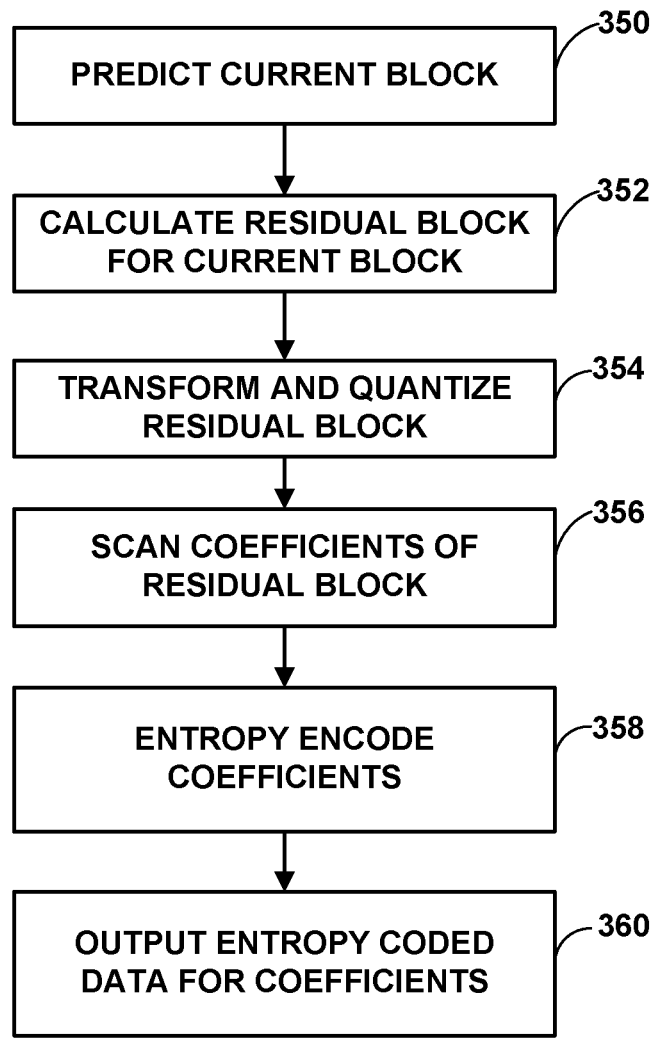
FIG. 11 is a flowchart illustrating an example method for encoding a current block.

FIG. 11 is a flowchart illustrating an example method for encoding a current block. The current block may comprise a current CU. Although described with respect to video encoder 200 (FIGS. 1 and 9), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 12:
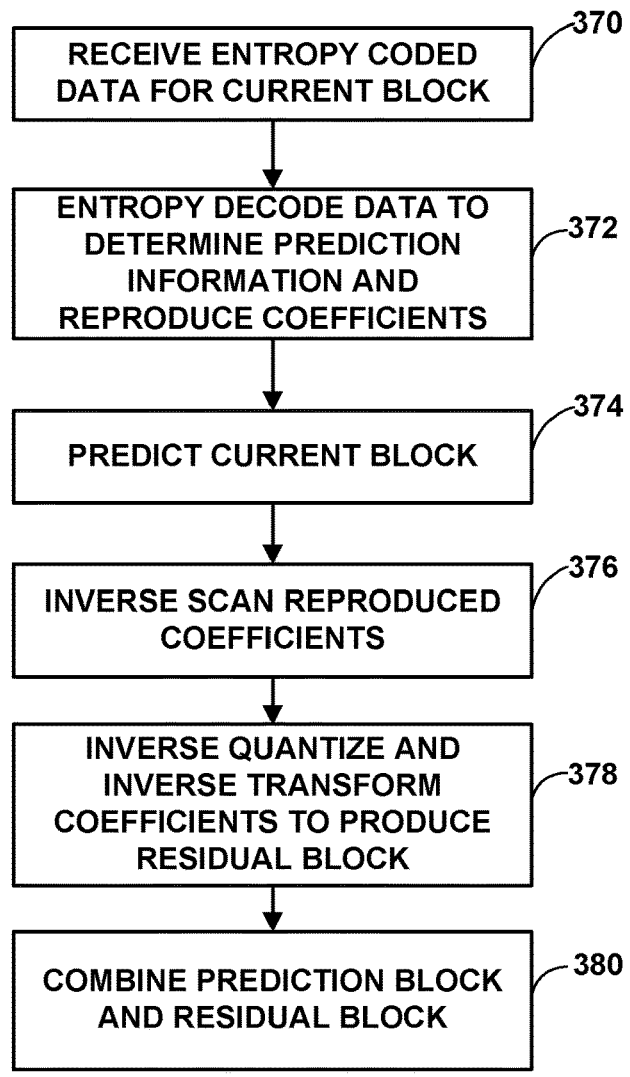
FIG. 12 is a flowchart illustrating an example method for decoding a current block.

FIG. 12 is a flowchart illustrating an example method for decoding a current block of video data. The current block may comprise a current CU. Although described with respect to video decoder 300 (FIGS. 1 and 10), it should be understood that other devices may be configured to perform a method similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 13:
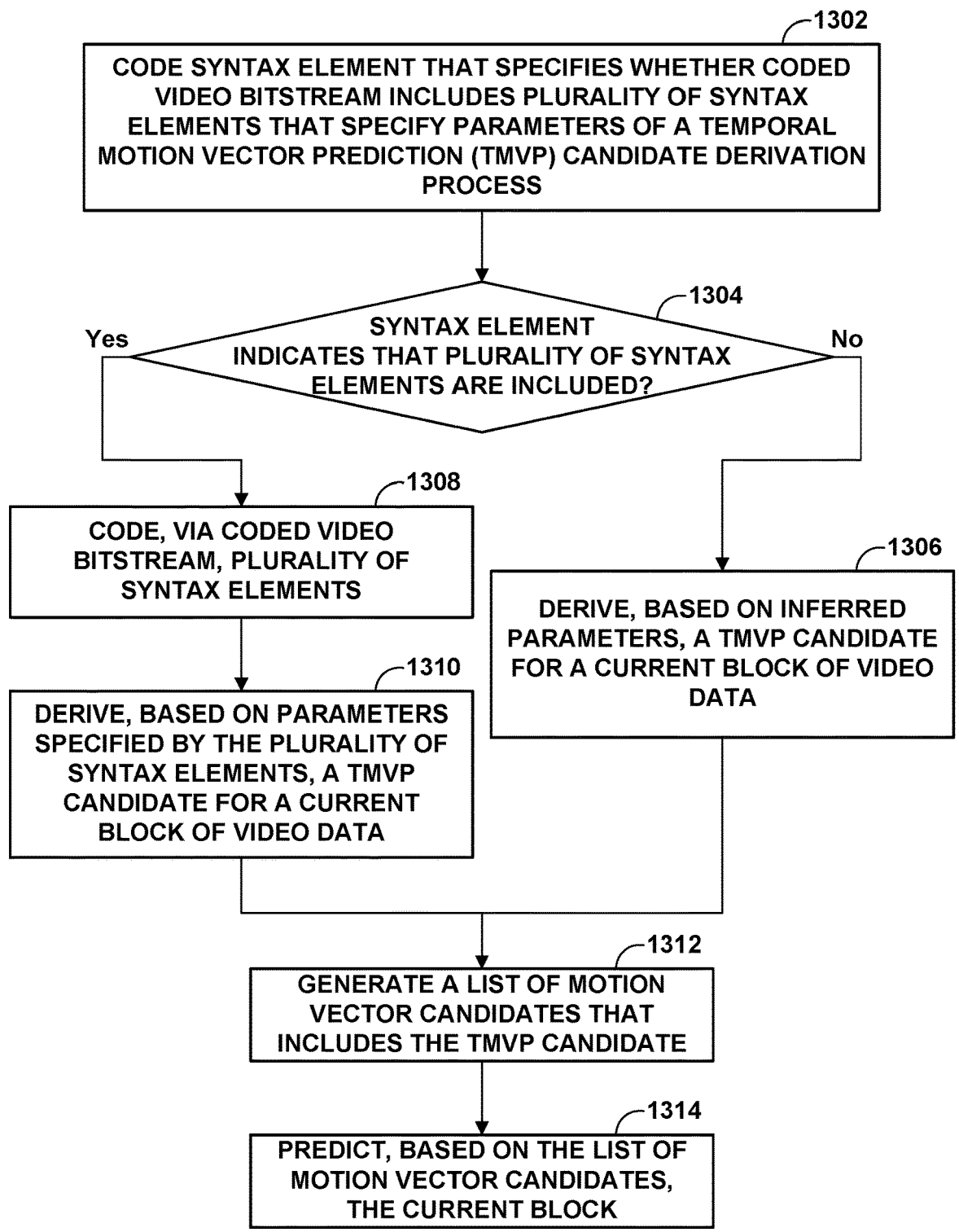
FIG. 13 is a flowchart illustrating an example method for deriving temporal motion vector predictor (TMVP) candidates, in accordance with one or more techniques of this disclosure.

FIG. 13 is a flowchart illustrating an example method for deriving temporal motion vector predictor (TMVP) candidates, in accordance with one or more techniques of this disclosure. Although described with respect to video decoder 300 (FIG. 10), it should be understood that other devices may be configured to perform a method similar to that of FIG. 13, such as video encoder 200 (e.g., as part of a reconstruction loop).

Video decoder 300 may decode, via a coded video bitstream, a syntax element that specifies whether the coded video bitstream includes a plurality of syntax elements that specify parameters of a temporal motion vector prediction (TMVP) candidate derivation process (1302). For instance, entropy decoding unit 302 of video decoder 300 may decode a temporal_mvp_asigned_flag from a slice header syntax structure of a coded video bitstream.

Video decoder 300 may selectively derive a TMVP candidate for a current block of video data (e.g., a current CU) based on inferred parameters or based on parameters specified by the plurality of syntax elements. For instance, where the syntax element does not specify that the coded video bitstream includes the plurality of syntax elements (e.g., temporal_mvp_asigned_flag has a value of 0) ("No" branch of 1304), video decoder 300 may derive, based on inferred parameters, a TMVP candidate for the current block of video data (1306). For instance, prediction processing unit 304 may infer at least one of a reference picture list for derivation of a collocated picture for derivation of the TMVP candidate; a reference index of the collocated picture; and a reference picture list for derivation of a motion vector candidate for derivation of the TMVP candidate. As one specific example, to derive the TMVP candidate based on the inferred parameters, prediction processing unit 304 may utilize the technique described above with reference to FIGS. 3A and 3B. In this way, prediction processing unit 304 may infer parameters of the TMVP candidate derivation process; and derive, by the video coder and based on the inferred parameters, the TMVP candidate for the current block of the current picture of video data.

Alternatively, where the syntax element specifies that the coded video bitstream includes the plurality of syntax elements (e.g., temporal_mvp_asigned_flag has a value of 1) ("Yes" branch of 1304), video decoder 300 may decode the plurality of syntax elements via the coded video bitstream (1308). For instance, entropy decoding unit 302 may decode a plurality of syntax elements that includes one or more of: a syntax element that specifies a reference picture list for derivation of a collocated picture for derivation of the TMVP candidate (e.g., col_pic_list_idx); a syntax element that specifies a reference index of the collocated picture (e.g., col_pic_ref_idx); and a syntax element that specifies a reference picture list for derivation of a motion vector candidate for derivation of the TMVP candidate (e.g., col_source_mvp_list_idx). In some examples, entropy decoding unit 302 may decode the plurality of syntax elements from a slice header syntax structure.

Video decoder 300 may derive, based on parameters specified by the plurality of syntax elements, a TMVP candidate for a current block of a current picture of video data (1310). For instance, prediction processing unit 304 may obtain a motion vector from a picture in the specified reference picture list for derivation of a collocated picture for derivation of the TMVP candidate having the specified reference index and having the specified source reference picture list.

Regardless of whether implicit or explicit derivation is used, video decoder 300 may generate, for the current block, a list of motion vector candidates, the list including the derived TMVP candidate (1312). For instance, prediction processing unit 304 may generate the motion vector candidate list to include the TMVP candidate and one or more spatial candidates, HMVP candidates, pairwise candidates, and zero candidates.

Video decoder 300 may predict, based on the list of motion vector candidates, the current block (1314). For instance, entropy decoding unit 302 may decode a syntax element that specifies which entry in the list of motion vector candidates is to be used. Prediction processing unit 304 may obtain samples from a block of video data identified by the motion vector candidate specified by the syntax element, referred to as the prediction block. Prediction processing unit 304 may combine the samples from the prediction block with residual data as discussed above with reference to FIG. 12.

The following examples may illustrate one or more aspects of the disclosure:

Example 1. A method of coding video data, the method comprising: deriving, by a video coder and for a current block of a current picture of video data, a temporal motion vector prediction (TMVP) candidate; generating, for the current block, a list of motion vector candidates, the list including the derived TMVP candidate; predicting, based on the list of motion vector candidates, the current block.

Example 2. The method of example 1, wherein deriving the TMVP candidate comprises: obtaining a motion vector of a collocated block of the current picture, the collocated block located in a collocated reference picture of the current picture; deriving the TMVP candidate as a scaled version of the obtained motion vector of the collocated block.

Example 3. The method of example 2, wherein deriving the TMVP candidate as the scaled version of the obtained motion vector of the collocated block comprises: determining, based on a picture order count (POC) difference between the current picture and the collocated reference picture, a scaling factor; and scaling, based on the scaling factor, the obtained motion vector of the collocated block to obtain the TMVP candidate.

Example 4. The method of example 3, wherein the scaling factor is a first scaling factor, the method further comprising: determining, based on a POC difference between the collocated reference picture and a reference picture of the collocated reference picture, a second scaling factor, wherein scaling the obtained motion vector of the collocated block to obtain the TMVP candidate comprises: scaling, based on the first scaling factor and the second, the obtained motion vector of the collocated block to obtain the TMVP candidate.

Example 5. The method of any of examples 1-4, further comprising: coding, via a coded video bitstream, one or more syntax elements that specify parameters of the TMVP candidate derivation process.

Example 6. The method of example 5, wherein the one or more syntax elements include one or more of a temporal_mvp_asigned_flag syntax element, a col_pic_list_idx syntax element, a col_pic_ref_idx syntax element, and/or a col_source_mvp_list_idx syntax element.

Example 7. The method of any of examples 1-4, wherein the video coder comprises a video decoder, the method further comprising: deriving, by the video decoder, parameters of the TMVP candidate derivation process.

Example 8. The method of any of examples 1-7, wherein coding comprises decoding.

Example 9. The method of any of examples 1-8, wherein coding comprises encoding.

Example 10. A device for coding video data, the device comprising one or more means for performing the method of any of examples 1-9.

Example 11. The device of example 10, wherein the one or more means comprise one or more processors implemented in circuitry Example 12. The device of any of examples 10 and 11, further comprising a memory to store the video data.

Example 13. The device of any of examples 10-12, further comprising a display configured to display decoded video data.

Example 14. The device of any of examples 10-13, wherein the device comprises one or more of a camera, a computer, a mobile device, a broadcast receiver device, or a set-top box.

Example 15. The device of any of examples 10-14, wherein the device comprises a video decoder.

Example 16. The device of any of examples 10-15, wherein the device comprises a video encoder Example 17. A computer-readable storage medium having stored thereon instructions that, when executed, cause one or more processors to perform the method of any of examples 1-9.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding, by a video coder and via a coded video bitstream, a syntax element that explicitly specifies whether the coded video bitstream includes a plurality of syntax elements that specify parameters of a temporal motion vector prediction (TMVP) candidate derivation process, wherein the syntax element is a binary flag syntax element, wherein:
a first value of the binary flag syntax element, that explicitly specifies whether the coded video bitstream includes the plurality of syntax elements that specify parameters of the TMVP candidate derivation process, indicates that the coded video bitstream includes the plurality of syntax elements that specify parameters of the TMVP candidate derivation process, and
a second value of the binary flag syntax element, that explicitly specifies whether the coded video bitstream includes the plurality of syntax elements that specify parameters of the TMVP candidate derivation process, indicates that the coded video bitstream does not include the plurality of syntax elements that specify parameters of the TMVP candidate derivation process, and wherein the plurality of syntax elements that specify the parameters of the TMVP candidate derivation process comprise:
a syntax element that specifies a reference picture list for derivation of a collocated picture for derivation of the TMVP candidate;
a syntax element that specifies a reference index of the collocated picture; and
a syntax element that specifies a reference picture list for derivation of a motion vector candidate for derivation of the TMVP candidate;
where the binary flag syntax element has the first value explicitly specifying that the coded video bitstream includes the plurality of syntax elements:
coding, by the video coder, the plurality of syntax elements via the coded video bitstream; and
deriving, by the video coder and based on parameters specified by the plurality of syntax elements, a TMVP candidate for a current block of a current picture of video data;
generating, for the current block, a list of motion vector candidates, the list including the derived TMVP candidate; and
predicting, based on the list of motion vector candidates, the current block.

2. The method of claim 1, wherein:
the syntax element that specifies whether the coded video bitstream includes the plurality of syntax elements comprises a temporal_mvp_assigned_flag syntax element;
the syntax element that specifies the reference picture list for derivation of the collocated picture for derivation of the TMVP candidate comprises a col_pic_list_idx syntax element;
the syntax element that specifies the reference index of the collocated picture comprises a col_pic_ref_idx syntax element; and
the syntax element that specifies the reference picture list for derivation of the motion vector candidate for derivation of the TMVP candidate comprises a col_source_mvp_list_idx syntax element.

3. The method of claim 1, wherein coding the plurality of syntax elements comprises coding the plurality of syntax elements in a slice header syntax structure of the coded video bitstream.

4. The method of claim 1, further comprising, where the syntax element does not specify that the coded video bitstream includes the plurality of syntax elements:
inferring, by the video coder, parameters of the TMVP candidate derivation process; and
deriving, by the video coder and based on the inferred parameters, the TMVP candidate for the current block of the current picture of video data.

5. The method of claim 1, wherein the video coder comprises a video decoder, and wherein coding comprises decoding.

6. The method of claim 1, wherein the video coder comprises a video encoder, and wherein coding comprises encoding.

7. A device for coding video data, the device comprising:
a memory configured to store at least a portion of a coded video bitstream; and
one or more processors that are implemented in circuitry and configured to:
code, via the coded video bitstream, a syntax element that explicitly specifies whether the coded video bitstream includes a plurality of syntax elements that specify parameters of a temporal motion vector prediction (TMVP) candidate derivation process, wherein the syntax element is a binary flag, wherein:
a first value of the binary flag syntax element, that explicitly specifies whether the coded video bitstream includes the plurality of syntax elements that specify parameters of the TMVP candidate derivation process, indicates that the coded video bitstream includes the plurality of syntax elements that specify parameters of the TMVP candidate derivation process, and
a second value of the binary flag syntax element, that explicitly specifies whether the coded video bitstream includes the plurality of syntax elements that specify parameters of the TMVP candidate derivation process, indicates that the coded video bitstream does not include the plurality of syntax elements that specify parameters of the TMVP candidate derivation process, and wherein the plurality of syntax elements that specify the parameters of the TMVP candidate derivation process comprise:
a syntax element that specifies a reference picture list for derivation of a collocated picture for derivation of the TMVP candidate;
a syntax element that specifies a reference index of the collocated picture; and
a syntax element that specifies a reference picture list for derivation of a motion vector candidate for derivation of the TMVP candidate;
where the binary flag syntax element has the first value explicitly specifying that the coded video bitstream includes the plurality of syntax elements:
code the plurality of syntax elements via the coded video bitstream; and
derive, based on parameters specified by the plurality of syntax elements, a TMVP candidate for a current block of a current picture of video data;
generate, for the current block, a list of motion vector candidates, the list including the derived TMVP candidate; and
predict, based on the list of motion vector candidates, the current block.

8. The device of claim 7, wherein:
the syntax element that specifies whether the coded video bitstream includes the plurality of syntax elements comprises a temporal_mvp_assigned_flag syntax element;
the syntax element that specifies the reference picture list for derivation of the collocated picture for derivation of the TMVP candidate comprises a col_pic_list_idx syntax element;
the syntax element that specifies the reference index of the collocated picture comprises a col_pic_ref_idx syntax element; and
the syntax element that specifies the reference picture list for derivation of the motion vector candidate for derivation of the TMVP candidate comprises a col_source_mvp_list_idx syntax element.

9. The device of claim 7, wherein, to code the plurality of syntax elements, the one or more processors are configured to code the plurality of syntax elements in a slice header syntax structure of the coded video bitstream.

10. The device of claim 7, wherein, where the syntax element does not specify that the coded video bitstream includes the plurality of syntax elements, the one or more processors are configured to:
infer parameters of the TMVP candidate derivation process; and derive, based on the inferred parameters, the TMVP candidate for the current block of the current picture of video data.

11. The device of claim 7, wherein the video coder comprises a video decoder, and wherein, to code the syntax element and the plurality of syntax elements, the one or more processors are configured to decode the syntax element and the plurality of syntax elements.

12. The device of claim 7, wherein the video coder comprises a video encoder, and wherein, to code the syntax element and the plurality of syntax elements, the one or more processors are configured to encode the syntax element and the plurality of syntax elements.

13. The device of claim 7, wherein the one or more processors comprise an application specific integrated circuit (ASIC).

14. A non-transitory computer-readable storage medium storing instructions that, when executed by one or more processors of a video coder, cause the one or more processors to:
code, via a coded video bitstream, a syntax element that explicitly specifies whether the coded video bitstream includes a plurality of syntax elements that specify parameters of a temporal motion vector prediction (TMVP) candidate derivation process, wherein the syntax element is a binary flag, wherein:
a first value of the binary flag syntax element, that explicitly specifies whether the coded video bitstream includes the plurality of syntax elements that specify parameters of the TMVP candidate derivation process, indicates that the coded video bitstream includes the plurality of syntax elements that specify parameters of the TMVP candidate derivation process, and a second value of the binary flag syntax element, that explicitly specifies whether the coded video bitstream includes the plurality of syntax elements that specify parameters of the TMVP candidate derivation process, indicates that the coded video bitstream does not include the plurality of syntax elements that specify parameters of the TMVP candidate derivation process, and wherein the plurality of syntax elements that specify the parameters of the TMVP candidate derivation process comprise:
a syntax element that specifies a reference picture list for derivation of a collocated picture for derivation of the TMVP candidate;
a syntax element that specifies a reference index of the collocated picture; and
a syntax element that specifies a reference picture list for derivation of a motion vector candidate for derivation of the TMVP candidate;
where the binary flag syntax element has the first value explicitly specifying specifics that the coded video bitstream includes the plurality of syntax elements:
code, by the video coder, the plurality of syntax elements via the coded video bitstream; and
derive, by the video coder and based on parameters specified by the plurality of syntax elements, a TMVP candidate for a current block of a current picture of video data;
generate, for the current block, a list of motion vector candidates, the list including the derived TMVP candidate; and
predict, based on the list of motion vector candidates, the current block.

15. The non-transitory computer-readable storage medium of claim 14, wherein the instructions that cause the one or more processors to code the plurality of syntax elements comprise instructions that cause the one or more processors to code the plurality of syntax elements in a slice header syntax structure of the coded video bitstream.

16. A device for coding video data, the device comprising:
means for coding, via a coded video bitstream, a syntax element that explicitly specifies whether the coded video bitstream includes a plurality of syntax elements that specify parameters of a temporal motion vector prediction (TMVP) candidate derivation process, wherein the syntax element is a binary flag, wherein:
a first value of two possible values of the binary flag syntax element, that explicitly specifies whether the coded video bitstream includes the plurality of syntax elements that specify parameters of the TMVP candidate derivation process, indicates that the coded video bitstream includes the plurality of syntax elements that specify parameters of the TMVP candidate derivation process, and
a second value of the two possible values of the binary flag syntax element, that explicitly specifies whether the coded video bitstream includes the plurality of syntax elements that specify parameters of the TMVP candidate derivation process, indicates that the coded video bitstream does not include the plurality of syntax elements that specify parameters of the TMVP candidate derivation process, and wherein the plurality of syntax elements that specify the parameters of the TMVP candidate derivation process comprise:
a syntax element that specifies a reference picture list for derivation of a collocated picture for derivation of the TMVP candidate;
a syntax element that specifies a reference index of the collocated picture; and
a syntax element that specifies a reference picture list for derivation of a motion vector candidate for derivation of the TMVP candidate;
means for coding the plurality of syntax elements via the coded video bitstream where the syntax element explicitly specifies that the coded video bitstream includes the plurality of syntax elements;
means for deriving, based on parameters specified by the plurality of syntax elements, a TMVP candidate for a current block of a current picture of video data;
means for generating, for the current block, a list of motion vector candidates, the list including the derived TMVP candidate; and
means for predicting, based on the list of motion vector candidates, the current block.

* * * * *